(12) United States Patent
Amemiya et al.

(10) Patent No.: US 9,151,470 B2
(45) Date of Patent: Oct. 6, 2015

(54) ILLUMINATION DEVICE

(75) Inventors: Fumimasa Amemiya, Yamanashi (JP);
Toru Ochiai, Yamanashi (JP); Fumihide Sakamoto, Yamanashi (JP); Junya Ozawa, Yamanashi (JP); Satoshi Tanaka, Yamanashi (JP); Yuichi Kagami, Yamanashi (JP); Hiroyuki Hirokawa, Yamanashi (JP); Shinnosuke Enomoto, Yamanashi (JP); Koji Ogino, Yamanashi (JP)

(73) Assignee: NISCA CORPORATION, Minamikoma-Gun, Yamanashi (JP)

( * ) Notice: Subject to any disclaimer, the term of this patent is extended or adjusted under 35 U.S.C. 154(b) by 0 days.

(21) Appl. No.: 13/982,636

(22) PCT Filed: Dec. 28, 2011

(86) PCT No.: PCT/JP2011/080424
§ 371 (c)(1),
(2), (4) Date: Jul. 30, 2013

(87) PCT Pub. No.: WO2012/105151
PCT Pub. Date: Aug. 9, 2012

(65) Prior Publication Data
US 2013/0314756 A1    Nov. 28, 2013

(30) Foreign Application Priority Data

| Jan. 31, 2011 | (JP) | 2011 018483 |
| Jan. 31, 2011 | (JP) | 2011 018484 |
| Jan. 31, 2011 | (JP) | 2011 018485 |
| Jan. 31, 2011 | (JP) | 2011-018486 |
| Jan. 31, 2011 | (JP) | 2011-018487 |
| Jun. 20, 2011 | (JP) | 2011-136172 |
| Jun. 20, 2011 | (JP) | 2011-136173 |
| Jun. 29, 2011 | (JP) | 2011-143797 |
| Aug. 31, 2011 | (JP) | 2011-188441 |

(51) Int. Cl.
*H04N 1/04* (2006.01)
*F21V 13/04* (2006.01)
*H04N 1/028* (2006.01)
*F21V 8/00* (2006.01)
*H04N 1/10* (2006.01)

(52) U.S. Cl.
CPC .............. *F21V 13/04* (2013.01); *H04N 1/0289* (2013.01); *H04N 1/02835* (2013.01); *G02B 6/0045* (2013.01); *H04N 1/1017* (2013.01)

(58) Field of Classification Search
CPC ................ H04N 1/02815; H04N 2201/02831; H04N 1/028; H04N 1/193; H04N 2201/02884; H04N 1/40056; H04N 2001/02868; H04N 1/1013; H04N 1/484; H04N 1/12; H04N 1/02835; F21V 13/04
USPC ................ 358/484, 475, 482, 483, 509, 514; 250/208.1, 227.11, 227.14; 399/220, 399/221; 355/67, 68
See application file for complete search history.

(56) References Cited

U.S. PATENT DOCUMENTS

| 5,808,295 A | 9/1998 | Takeda et al. | |
| 6,351,594 B1 | 2/2002 | Nakamura et al. | |
| 6,360,030 B1 | 3/2002 | Kawai et al. | |
| 7,593,139 B2 * | 9/2009 | Kawai et al. | 358/400 |
| 7,990,584 B2 * | 8/2011 | Ikeda | 358/484 |
| 2002/0054387 A1 | 5/2002 | Yokota et al. | |
| 2005/0150956 A1 | 7/2005 | Ikeda et al. | |
| 2009/0034285 A1 | 2/2009 | Lee et al. | |
| 2009/0080213 A1 | 3/2009 | Onishi et al. | |
| 2009/0201675 A1 | 8/2009 | Onishi et al. | |
| 2009/0219586 A1 * | 9/2009 | Fujimoto et al. | 358/494 |
| 2009/0310190 A1 | 12/2009 | Ikeda | |
| 2010/0014315 A1 | 1/2010 | Fujimoto | |
| 2010/0103681 A1 * | 4/2010 | Kamei et al. | 362/298 |
| 2010/0245943 A1 | 9/2010 | Suyama et al. | |
| 2014/0111835 A1 * | 4/2014 | Ozawa et al. | 358/475 |

FOREIGN PATENT DOCUMENTS

| | | |
|---|---|---|
| JP | H06-16943 U | 3/1994 |
| JP | 2007-300536 A | 11/2007 |
| JP | 2009-025679 A | 2/2009 |
| JP | 2010-028216 A | 2/2010 |
| JP | 2010-068031 A | 3/2010 |
| JP | 2010-193360 A | 9/2010 |
| WO | 2008/013234 A1 | 1/2008 |

OTHER PUBLICATIONS

Europe Patent Office, "Supplementary European Search Report for EP 11857571.1," Jun. 10, 2014.
Japan Patent Office, "Office Action for JP 2011-018483," Jul. 15, 2014.
Japan Patent Office, "Office Action for JP 2011-018484," Jul. 15, 2014.
Japan Patent Office, "Office Action for JP 2011-018485," Jul. 15, 2014.
Japan Patent Office, "Office Action for JP 2011-018486," Jul. 15, 2014.
Japan Patent Office, "Office Action for JP 2011-018487," Jul. 15, 2014.

* cited by examiner

*Primary Examiner* — Cheukfan Lee
(74) *Attorney, Agent, or Firm* — Manabu Kanesaka

(57) ABSTRACT

To provide an illumination device in which there is no variation in light intensity distribution of the illumination device, and in which illumination spots, particularly light intensity spots, are not prone to occur in a read image in an image reading device, by maintaining a constant gap between a light source and an end face of a light guide. The illumination device includes: a light guide having an end face for taking in light, a diffuse reflecting surface for diffusely reflecting the light taken in from the end face, and a light exit surface for emitting the light that is diffusely reflected at the diffuse reflecting surface towards an irradiation surface. The illumination device further include a reflector having a diffuse reflecting surface that reflects light from the light source toward the one end face of the light guide. The light guide has, at the one end, a flange portion that abuts the reflector, the light source is mounted to a circuit board, and the reflector is held between the flange portion of the light guide and circuit board so as to maintain a predetermined gap between the light source and light guide.

19 Claims, 25 Drawing Sheets

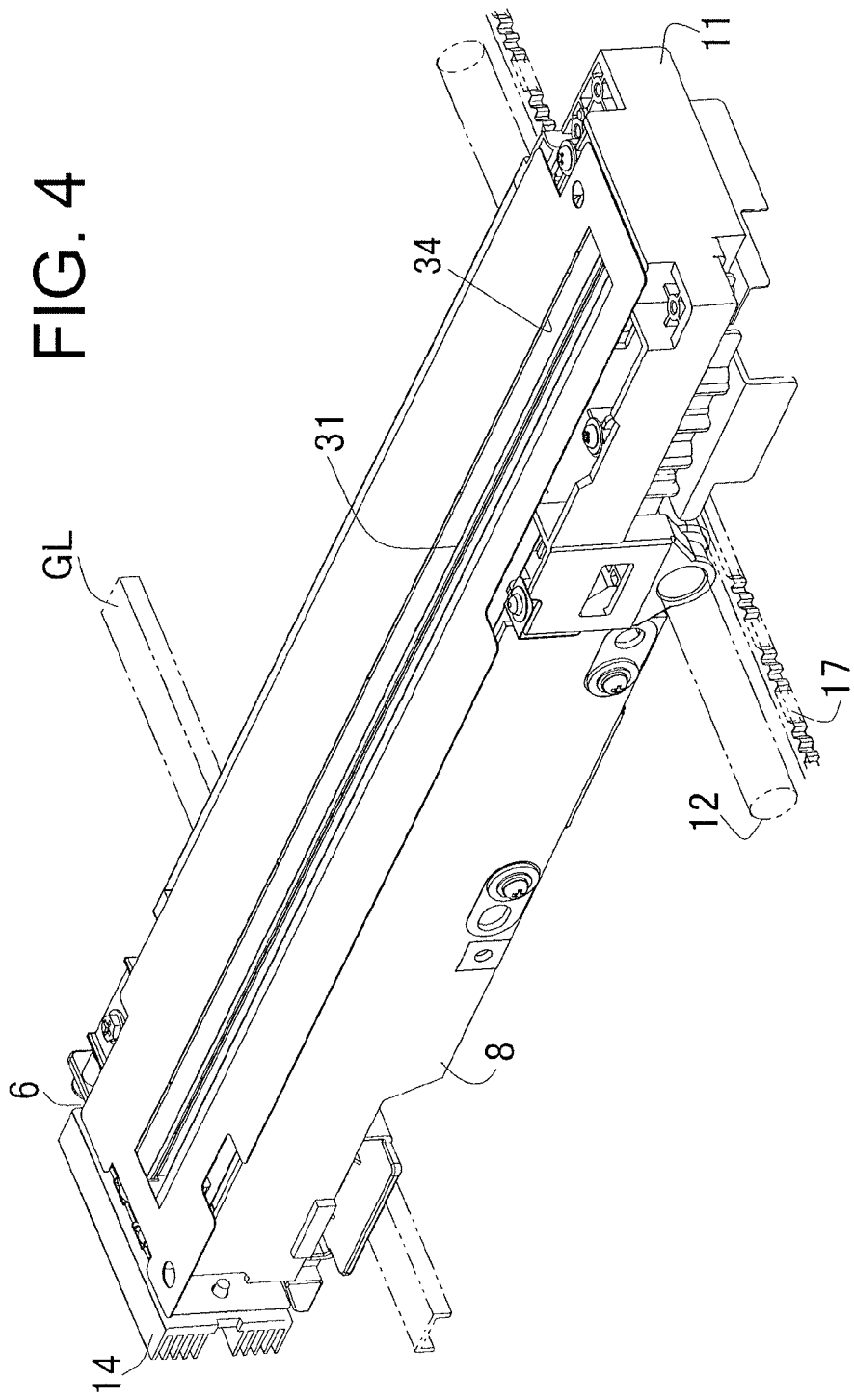

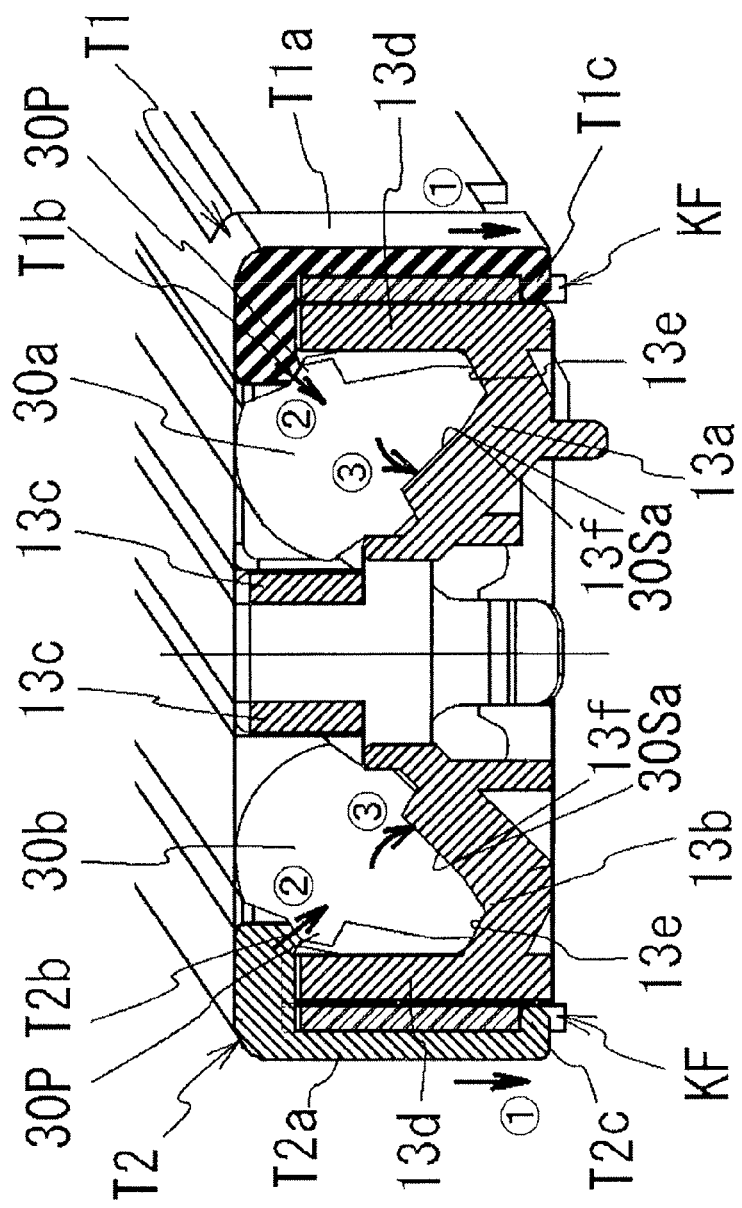

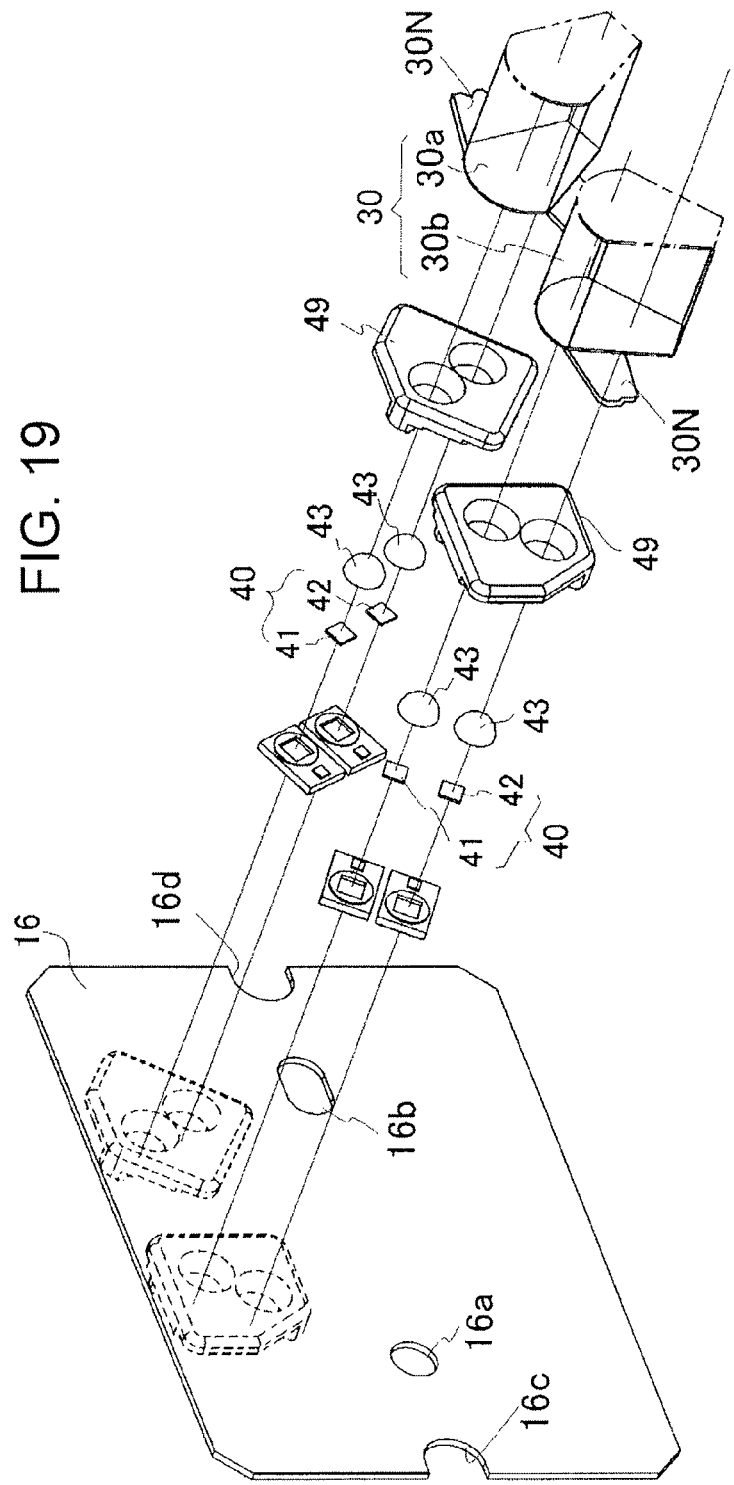

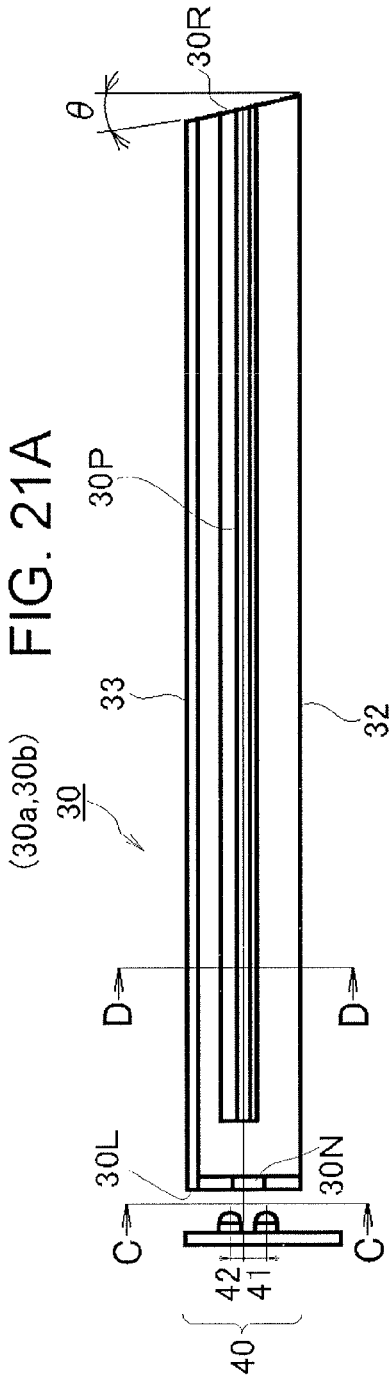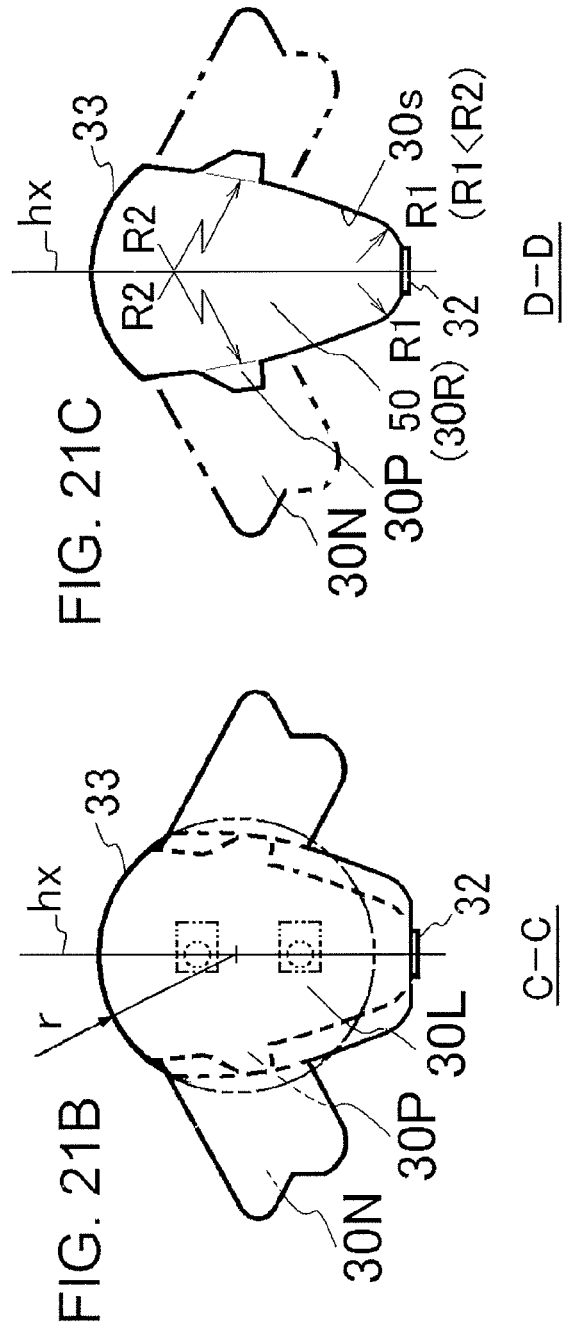

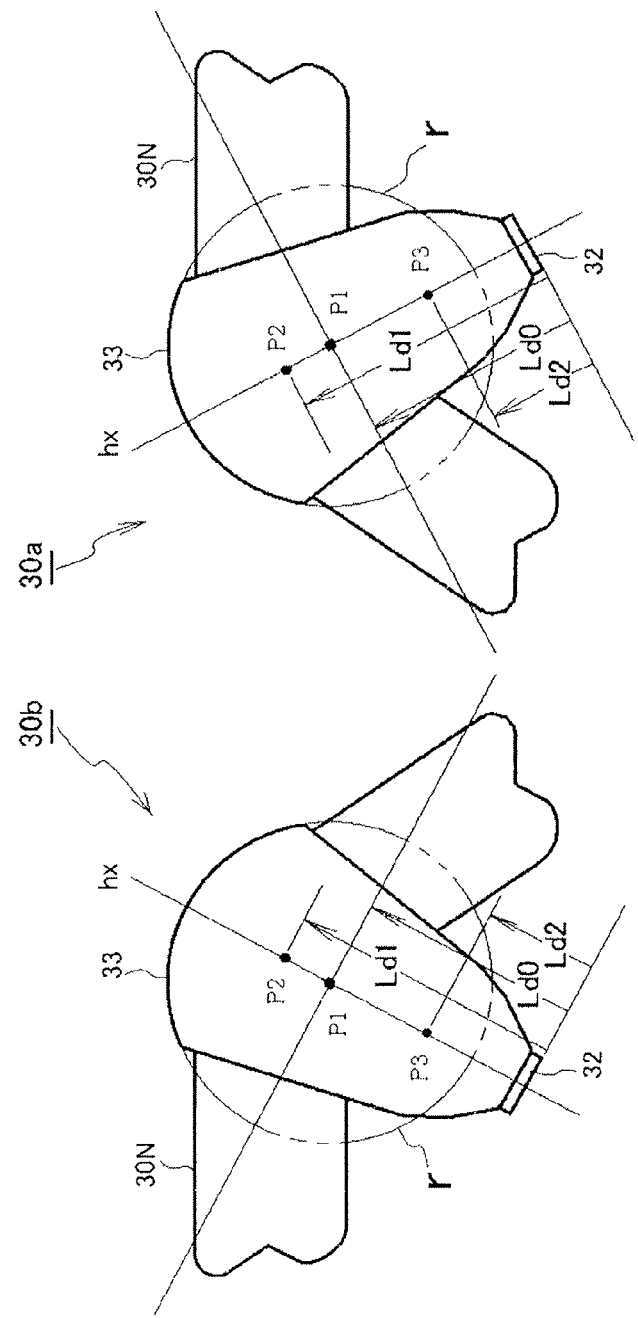

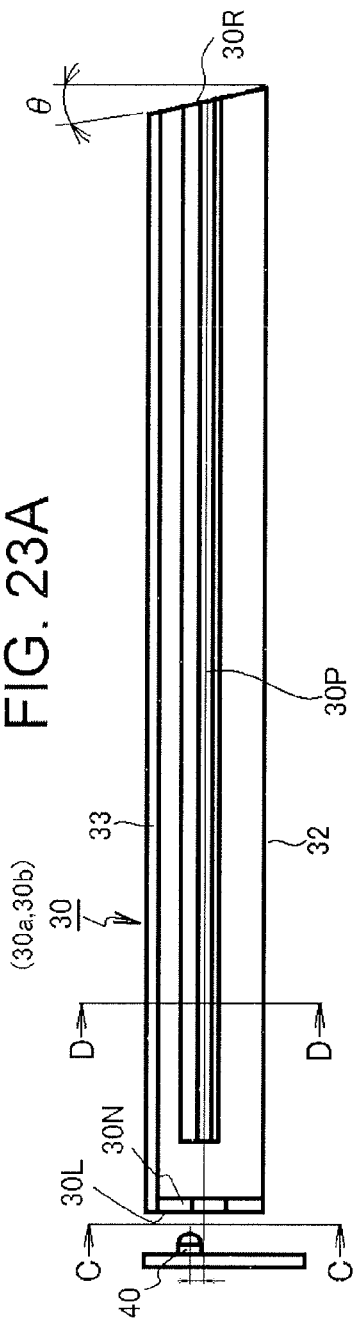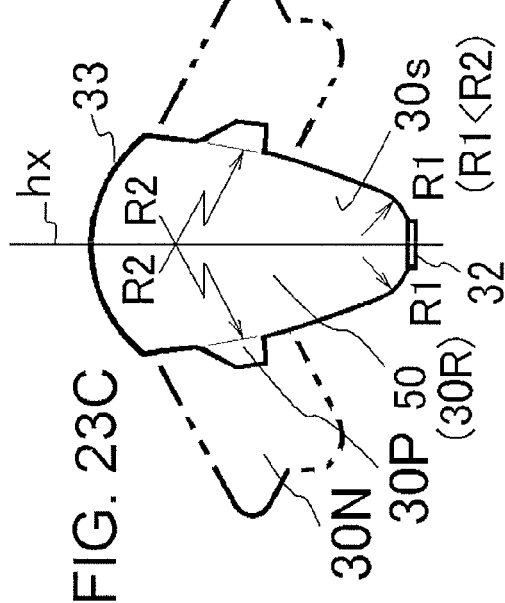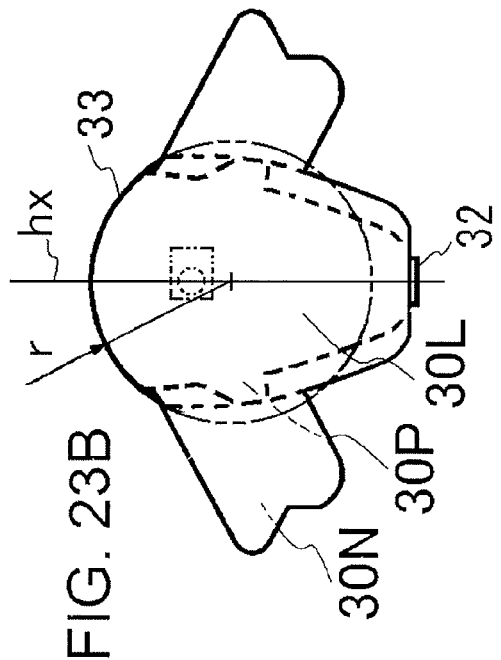

ILLUMINATION DEVICE

TECHNICAL FIELD

The present invention relates to an illumination device for an image reading device that is incorporated in optical instruments such as a scanner, a copier, and a facsimile and scans an image of a document or a photograph to read the image.

BACKGROUND ART

Generally, as an image reading device of such a type, there is known an image reading device as disclosed in Patent Document 1 and Patent Document 2, configured to irradiate a document fed onto or placed on a reading platen with linear light emitted from a light guide and to receive reflected light therefrom by a photoelectric conversion sensor, thereby reading an image of the document.

An illumination device mounted in the image reading device disclosed in Patent Document 1 has a light source unit and a photoelectric conversion sensor on a scanning carriage that moves along a reading platen and receives reflected light of light emitted from the light source unit by the photoelectric conversion sensor. The photoelectric sensor, which is configured as a line sensor, reads an image on the platen in a line-sequential manner while moving in a scanning carriage moving direction (sub-scan direction) perpendicular to a reading direction (main-scan direction) of the photoelectric conversion sensor.

The light source used as a light source of the illumination device includes a white LED light source serving as a light emission source and a light guide that diffuses light from the light source uniformly in the main scan direction to serve as a rod-like luminous body and is required, in this case, to emit light uniformly in the main scan direction (longitudinal direction of the line sensor).

In order to meet the above requirement, the light source unit is configured as follows: the light guide is formed into a rod-like shape having a diffusion reflecting surface and a light exiting surface which are disposed opposite to each other in the can direction; a light source is provided at one end portion of an outer cover in which the light guide is housed; one end surface of the light guide housed in the outer cover is made to face the light source with a predetermined gap provided therebetween; and a reflecting surface serving as a pseudo light source (although a detailed description thereof is omitted) is formed at the other end surface of the light guide. The configuration described above allows light emitted from the light guide to uniformly enter the reading platen.

Further, an inner side surface of the outer cover at the one end portion thereof having the light source is sloped to allow the outer cover itself to serve as a reflector for guiding the light emitted from the light source to the light guide, thereby allowing the light from the light source to efficiently enter the light guide.

Further, the image reading device disclosed in Patent Document 1 includes so-called a contact type optical system in which a SELFOC lens is provided for each sensor element in the line sensor. On the other hand, in an image reading device of so-called an optical reduction system that uses a condenser lens like an image reading device disclosed in Patent Document 2, intensity of light at both end portions of a reading area in the main scan direction is reduced according to the cosine fourth power law. In order to cope with this, in an image reading device of such a type, the gap between the light guide and light source and a position of the light source facing the light guide are adjusted so as to increase light intensity distribution characteristics at an irradiation surface (reading surface) by an amount corresponding to the attenuation caused due to the cosine fourth power law.

Thus, the light intensity distribution characteristics of the illumination device using the light guide need to be managed depending on usage thereof. Particularly, as described above, when the illumination device is used as the illumination device for the image reading device, the light intensity distribution characteristics thereof need to be managed such that the light emitted from the light guide and illuminating the reading platen becomes uniform linear light in the case of the illumination device of Patent Document 1 and such that the light emitted from the light guide and illuminating the reading platen becomes linear light having an intensity greater at the both end portions of the reading area in the main scan direction than at a center thereof in the case of the illumination device of Patent Document 2. In order to meet a condition that maintains a state the liner light based on the preciously set intensity distribution, it is essential to take into consideration, at designing, maintenance of the predetermined gap between the end surface of the light guide housed in the outer cover and the light source serving as a light emission source, position of the light source facing the end surface of the light guide, a shape of the light guide, light directivity of the light source, and the like.

CITATION LIST

Patent Document

Patent Document 1: Re-publication of PCT International Application WO08/013,234
Patent Document 2: Japanese Patent Application Laid-Open Publication No. 2010-193360

DISCLOSURE OF THE INVENTION

Problems to be Solved by the Invention

It is necessary to provide a plurality of light sources for one light guide in order to increase the entire light intensity, depending on usage of the above illumination device. In this case, how the plurality of light sources facing the light guide are disposed and what is taken into consideration in doing so significantly influence spectral characteristics.

Particularly, when two light sources are used, setting of mounting positions thereof with respect to the light guide is very important. That is, light intensity is adjusted such that first the light intensity distribution becomes substantially symmetric about a center thereof obtained by determining the position of one light source, and then the position of the other light source is adjusted to adjust a ratio of the intensities between the center of the light intensity distribution and both end portions thereof.

However, conventionally, the light guide used for the illumination device of the image reading device of a such a type has a complicated outer shape, making it difficult to set the reference position of the light source with respect to the light guide. Thus, if the position of a first light source to be used as the reference position is displaced, the position of a second light source is easily displaced, with the result that the light intensity distribution of the illumination device is varied to cause illumination spots. This in turn causes a problem that light intensity spots may occur in an image read by an image reading device using the illumination device as above.

Further, a configuration in which the plurality of light sources are disposed facing the light guide with a predetermined gap provided therebetween makes it difficult to set the end surface of the light guide and light exit surfaces of the plurality of light sources parallel to each other, which may cause the variation in the light intensity distribution, like the above-mentioned displacement of the position of the light source.

The present invention has been made in view of the above problems, and an object thereof is to provide an illumination device, in which positions of two light sources with respect to the light guide can be easily set, there is no variation in the light intensity distribution, or illumination spots. Particularly, light intensity spots are not prone to occur in a read image in an image reading device.

Means for Solving the Problems

In order to achieve the aforementioned object, there is provided, according to claim 1, an illumination device including: a light guide including an end face for taking in light, a diffuse reflecting surface for diffusing and reflecting the light taken in from the end face, and a light exit surface for emitting the light that is diffused and reflected at the diffusing and reflecting surface towards an irradiation surface; and a light source facing the one end face of the light guide. The light exit surface of the light guide is formed into an arc-like shape. The diffusing and reflecting surface is disposed at a position at which a normal line to the arc-like light exit surface passes. The normal line also passes center of a circle made by the arc-like light exit surface and the light emitted passes on the normal line. The light source is mounted on a circuit board formed separately from the light guide and disposed at a position which is set on the light axis or the normal line of the diffusing and reflecting surface and shifted to the light exit surface side with respect to the center of the circle. The light source on the circuit board is retained at a position spaced apart from the end face of the light guide by a predetermined gap.

Further, there is provided, according to claim 8, the illumination device according to claim 1, wherein the light source includes first and second light sources, the first light source is disposed at a first position which is set on the optical axis normal line of the diffuse reflecting surface and shifted to the light exit surface side with respect to the center of the circle, and the second light source, is disposed at a second position which is set on the optical axis normal line and shifted to the diffuse reflecting surface side with respect to the center of the circle.

Further, there is provided, according to claim 9, the illumination device according to claim 1, the light guide and the circuit board have a common single reference surface, the diffuse reflecting surface of the light guide is retained at a first position determined based on the common reference surface, and the circuit board is positioned based on the common reference surface and disposed at a second position at which the light source faces the one end face of the light guide.

Further, there is provided, according to claim 10, the illumination device according to claim 9, wherein the common reference surface is provided in a unit frame that constitutes the illumination device, the light guide is housed in a frame body supported by the unit frame, and the diffuse reflecting surface of the light guide is retained through the frame body at the first position determined based on the common reference surface.

Further, there is provided, according to claim 11, the illumination device according to claim 10, wherein the common reference surface is set on the unit frame that constitutes the illumination device, a positioning portion for positioning the circuit board is formed in the unit frame, and the circuit board has a positioning support portion supported by the positioning portion formed in the unit frame.

Further, there is provided, according to claim 12, the illumination device according to claim 11, wherein the light guide has a projection formed on a side surface along the optical axis normal line formed by the diffuse reflecting surface and locked by the frame body along a longitudinal direction of the light guide, and a distal end of the projection on the light source side is formed between the light source side end face of the diffuse reflecting surface and light source side end face of the illumination area with respect to the illumination line.

Advantages of the Invention

The present invention has the following advantages.

In the illumination device according to claim 1, the light intensity can be made higher at the both end portions of the light guide than at the center portion thereof. This allows the light intensity distribution most appropriate for the illumination device to be mounted in the image reading device of the optical reduction system to be achieved.

In the illumination device according to claim 8, the light intensity can be increased by about two times, and the light intensity can be made higher at the both end portions of the light guide than at the center portion thereof. As a result, it is possible not only to achieve the light intensity distribution most appropriate for the illumination device to be mounted in the image reading device of the optical reduction system but also to increase illumination intensity to thereby increase an image reading speed, which is advantageous for the image reading device having so-called a sheet-through mode in which the document image is read while the document is automatically fed.

In the illumination device according to claim 9, the mounting reference position of the luminous body and mounting reference position of the light guide can be easily made to coincide with each other based on the common reference surface to minimize a variation in the mounting position (position with respect to the optical axis normal line direction) of the luminous body facing the end face of the light guide, thereby reducing occurrence of the illumination spots as well as achieving adjustment of a predetermined gap between the light guide and luminous body. In particular, in the image reading device, intensity spots do not occur in the read image.

In the illumination device according to claim 10, it is possible to eliminate the need of adjusting the mounting position (position with respect to the optical axis normal line direction) of the luminous body facing the end face of the light guide can be fixed without displacement, thereby facilitating assembly of the device.

In the illumination device according to claim 11, simply by mounting the positioning support portion of the circuit board to the positioning portion of the unit frame serving as a reference for mounting the light guide, the mounting position (position with respect to the optical axis normal line direction) of the luminous body facing the end face of the light guide can be fixed without displacement, thereby significantly facilitating assembly of the device.

In the illumination device according to claim 12, the light introduced from the light source to the light guide and then reflected at the base end portion is not disturbed by the projection. Further, a locking condition with the frame body can be maintained. Thus, in particular, a variation in the light intensity distribution on the light source side end face in the longitudinal direction of the illumination area can be reduced to thereby reduce illumination spots.

BRIEF DESCRIPTION OF THE DRAWINGS

FIGS. 3A to 3C are views for explaining a means for preventing reflection between light guides, in which FIG. 3A is a main part enlarged view of a first example of the reflection preventing means, FIG. 3B is a main part enlarged view of a second example of the reflection preventing means, and FIG. 3C is a main part enlarged view of a third example of the reflection preventing means.

FIG. 4 is a perspective view of an outer structure of a carriage in the image reading device of FIG. 1, as viewed from above.

FIGS. 14A to 14C are main part enlarged views of the illumination device, in which FIG. 14A is a cross-sectional side view, FIG. 14B is an outer appearance view of the light guide as viewed from one end side (luminous body side) thereof, and FIG. 14C is an outer appearance view of the light guide as viewed from the other end side thereof.

FIGS. 15A to 15E are schematic view for explaining a shape of the light guide in the illumination device of FIG. 7, in which FIG. 15A is a main part enlarged perspective view, FIG. 15B is a plan view as viewed from a reflecting surface side, FIG. 15C is a cross-sectional view at a position of a, FIG. 15D is a cross-sectional view at a position of b, and FIG. 15E is a cross-sectional view at a position of c.

FIG. 16 is a cross-sectional enlarged view for explaining a light guide support mechanism of the illumination unit of FIG. 7.

FIG. 19 is an exploded perspective view of the light source unit of FIG. 18.

FIGS. 20A to 20C are views illustrating structures of the luminous body and a luminous body board in the light source unit of FIG. 19, in which FIG. 20A is a plan view illustrating a light power source supply circuit wiring pattern on the luminous body board, FIG. 20B is a cross-sectional view taken along a line Z-Z, and FIG. 20C is a plan view illustrating a position of the luminous body as viewed from the other end side of the light guide.

FIGS. 21A to 21C are views for explaining a positional relationship between the luminous body and light guide in the illumination device of FIG. 13, in which FIG. 21A is a side view, FIG. 21B is a plan view illustrating a position of the luminous body with respect to the light guide as viewed from the one end (luminous body side) of the light guide, and FIG. 21C is a plan view illustrating the position of the luminous body as viewed from the other end side of the light guide.

FIG. 22 is an enlarged plan view illustrating the position of the luminous body with respect to the light guide of FIG. 21B.

FIGS. 23A to 23C, which correspond to FIGS. 21A to 21C, respectively, are views for explaining a positional relationship between the luminous body and light guide in the illumination device of another embodiment, in which FIG. 23A is a side view, FIG. 23B is a plan view illustrating a position of the luminous body with respect to the light guide as viewed from the one end (luminous body side) of the light guide, and FIG. 23C is a plan view illustrating the position of the luminous body as viewed from the other end side of the light guide.

MODE FOR CARRYING OUT THE INVENTION

Hereinafter, the entire configuration of an image reading device equipped with an illumination device according to the present invention, a modification of the image reading device of the present invention, spectral characteristics of the illumination device in the image reading device of the present invention, and an image data processing section that reads a document image in the image reading device of the present invention will be described based on FIGS. 1 to 22, FIG. 23, FIG. 24, and FIG. 25, respectively.

[Embodiment of Image Reading Device]

Figure 1:
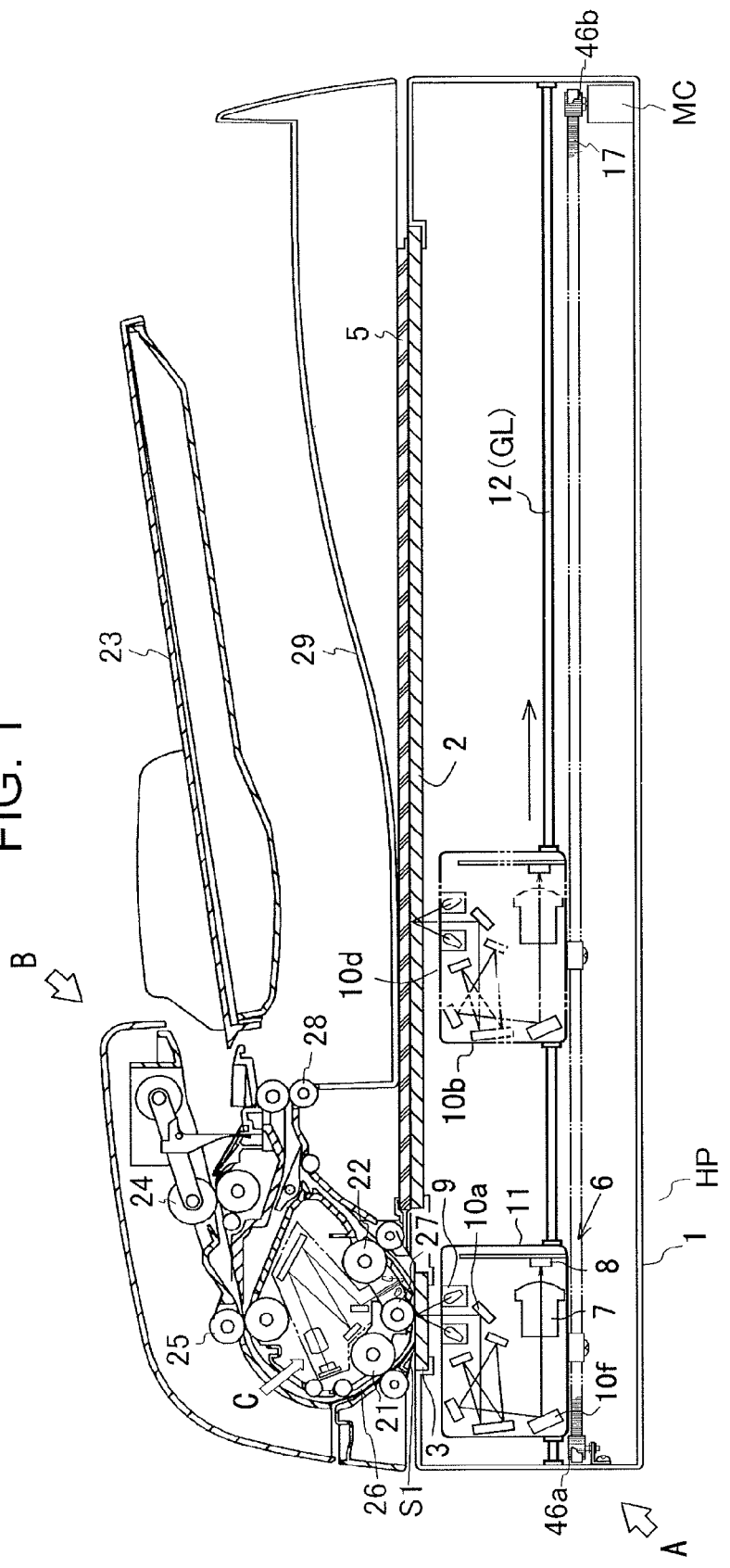
FIG. 1 is a cross-sectional view illustrating the entire configuration of an image reading device according to the present invention.

First, an embodiment of an image reading device quipped with an illumination device according to the present invention will be described based on FIGS. 1 to 22. FIG. 1 is a view for explaining the entire configuration of the image reading device. FIGS. 2 to 6 are views for explaining a configuration of a reading carriage that is mounted in the image reading device and configured to read a document image. FIGS. 7 to 15 are views explaining configuration of the illumination device as a light source on the reading carriage. FIGS. 17 to 22 are views for explaining a light source unit of the illumination device. In particular, FIGS. 3A to 3C are views for explaining in detail embodiments of a reflection preventing means for preventing reflection between light guides according to the present invention, in which FIG. 3A illustrates a first embodiment of the reflection preventing means for preventing reflection between the light guides, FIG. 3B illustrates a second embodiment of the reflection preventing means for preventing reflection between the light guides, and FIG. 3C illustrates a third embodiment of the reflection preventing means for preventing reflection between the light guides.

<Entire Configuration of Image Reading Device>

FIG. 1 is a cross-sectional view illustrating the entire configuration of the image reading device. The image reading device includes an image reading unit A to be described below and a document feeding unit B mounted on the image reading unit A.

(Image Reading Unit A)

The image reading unit A includes, in a device housing 1, a first platen 2 and a second platen 3. The first and second platens 2 and 3 are each formed of a transparent material such as a glass and each fixed to a top portion of the device housing 1. The first platen 2 is formed to have a dimension corresponding to a maximum dimensional size of a document to be set manually thereon, and the second platen 3 is formed to have a width corresponding to a maximum width size of the document that can be used so as to allow reading of the document fed at a predetermined speed. The first and second platens 2 and 3 are arranged side by side in a line, and a reading carriage 6 is incorporated therebelow. The reading carriage 6 is reciprocated by a carriage motor Mc in a state where it is supported inside the device housing 1 so as to be movable in parallel to a platen surface while being guided by a guide shaft 12 and a rail member GL.

(Document Feeding Unit B)

The document feeding unit B is disposed above the first and second platens 2 and 3 so as to cover the first and second platens 2 and 3 and includes a lead roller (document feeding means) 21 that feeds a document sheet to the second platen 3 and a takeout roller 22. Further, there are disposed on an upstream side of the lead roller 21a sheet supply stacker 23 in which document sheets are housed in a stacked state, a sheet supply roller 24 that separately feeds the sheets stacked in the sheet supply stacker 23 one by one, and a pair of resist rollers 25 that corrects skew of a leading end of the sheet that is separately fed. Further, a lead sensor S1 that detects the leading end of the document to be fed toward the second platen 3 is provided on a sheet supply path 26 that guides the document sheet from the sheet supply stacker 23 to second platen 3, and a backup roller 27 is disposed on the upper surface of the second platen 3. The backup roller 27 rotates at the same circumferential speed as the lead roller 21 to cause the document sheet to be fit onto the second platen 3 and feeds the document sheet to the takeout roller 22 disposed on a downstream side of the platen. Further, there are disposed on the downstream side of the takeout roller 22, a discharge roller 28 and a discharge stacker 29. The discharge roller 28 is disposed below the sheet supply stacker 23 in parallel thereto in a vertical direction. Further, there is provided on a bottom position of the discharge stacker 29 a platen cover 5 that holds the document sheet placed on the first platen 2 while pressing the document sheet.

<Double-Side Reading Mechanism>

Further, there is provided, inside a document reverse path guide formed by the resist roller pair 25, lead roller 21, backup roller 27, and takeout roller 22, an image reading unit C for reading a rear surface of a document surface read by the image reading unit A. Details of the image reading unit C will be described later.

In place of the backup roller 27, a backup guide may be disposed above the platen. Further, although the image reading device described as the first embodiment has a configuration in which the document feeding unit B is mounted on the first and second platens 2 and 3 arranged side by side in a line, it may be configured such that the only the first platen 2 is used (second platen 3 is removed) and that an access cover is attached in place of the document feeding unit B so as to cover the first platen 2.

(Document Fixed-Reading Mode <Flat Bed Mode>)

For the image reading device having the above configuration, an operator selects a document fixed-reading mode, so-called a flat bed mode on a device panel of the image reading unit A or a screen of a PC. In a case where the document sheet set on the first platen 2 is read, the operator pulls upward the document feeding unit B openably mounted to the device housing 1 of the image reading unit A, places the document sheet on the exposed first platen 2, and brings down the platen cover 5 of the document feeding unit B to cover the document sheet. The reading carriage 6 moves along the guide shaft 12 below the document sheet to perform document sheet reading operation.

(Document Pass-Through Reading Mode <Sheet-Through Mode>)

In a case where the operator selects a document pass-through reading mode, so-called a sheet-through mode on the device panel of the image reading unit A or the PC screen to read the document sheet fed by the document feeding unit B and passing through the second platen 3 is read, reading operation of the document sheet fed by the document feeding unit B is performed in a state where the reading carriage 6 is moved along the guide shaft 12 to a reading position corresponding to the second platen 3 by the carriage motor Mc and stopped there.

<Configuration of Reading Carriage>

Next, the reading carriage 6 will be described.

First, based on FIG. 2, the entire configuration of the reading carriage 6 will be described. The reading carriage 6 includes an illumination unit 9 (illumination device) and a unit frame 11 constituting an optical unit. The unit frame 11 is formed of a heat resistant resin and a metal plate and, as illustrated, an entire frame body of the illumination unit 9 is completely housed in a top portion of the unit frame 11 facing the first and second platens 2 and 3. That is, there is formed a concave portion that houses the illumination unit 9 such that a top surface of the unit frame 11 and an upper surface of the frame body of the illumination unit 9 constitute a flat surface, and the illumination unit 9 is detachably mounted in the concave portion.

The illumination unit 9 includes a pair of first and second illumination units 9a and 9b, a light guide housing portion 13 (light guide holder), and a rigid body KR. The light guide housing portion 13 houses the pair of first and second illumination units 9a and 9b. The rigid body KF is formed of metal or a material equivalent to metal so as to eliminate warpage of the light guides 9a, 9b and light guide housing portion 13 caused in molding time or due to aging. The optical unit includes: a reflecting mirror 10 including first to sixth mirrors 10a to 10f each deflecting light reflected from the document sheet illuminated by light of the illumination unit 9; a condenser lens 7 that condenses the light reflected from the document sheet and then reflected from the reflecting mirror 10; and a line sensor 8 (image pickup element) disposed at an image forming part at which an image is formed by the condenser lens 7, thereby constituting a reduction optical system. The optical unit is electrically connected to an image processing section (data processing board) to be described later through a not illustrated data transfer cable so as to allow image data output from the line sensor 8 as an electric signal to be transferred to the image processing section. It is optimum, as to a depth of the concave portion in whish the illumination unit 9 is housed, that the fourth mirror 10d that sandwiches a reflection area between the first and second mirrors 10a, 10b with the third mirror 10c can be kept within a lateral space formed by the concave portion, as illustrated in FIG. 2. This eliminates formation of an unnecessary space and allows effective use of a space inside the optical unit, thereby reducing a size of the entire device. Further, a bottom portion end surface of the rigid body KF or a bottom portion of the light guide housing portion 13 constituting the frame body of the illumination unit 9 is positioned within a light path L between the first mirror 10a and second mirror 10b. This restricts spreading of the reflected light traveling from the first mirror 10a to second mirror 10b and, in particular, blocks the light reflected by the first mirror 10a from entering directly the fifth mirror 10e.

Figure 2:
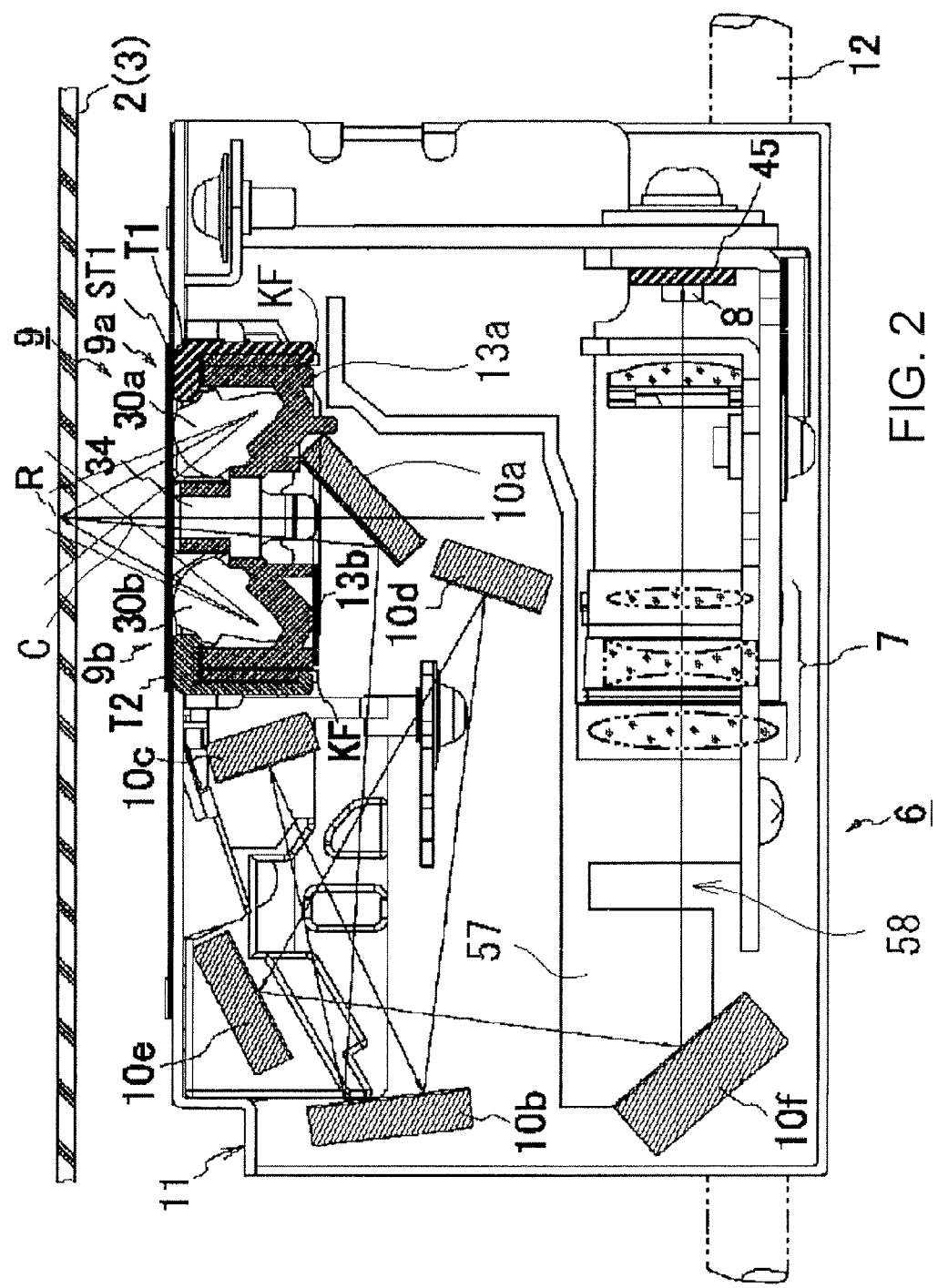
FIG. 2 is a cross-sectional view illustrating a reading carriage that reads a document image in the image reading device of FIG. 1.
Figure 3A:
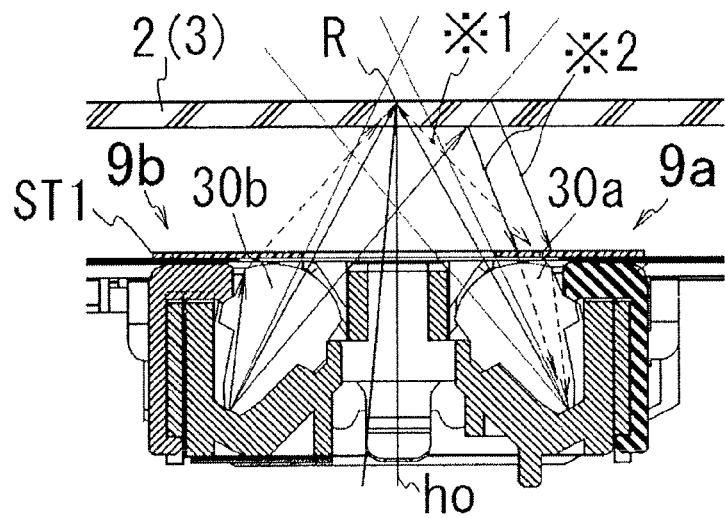
Figure 3B:
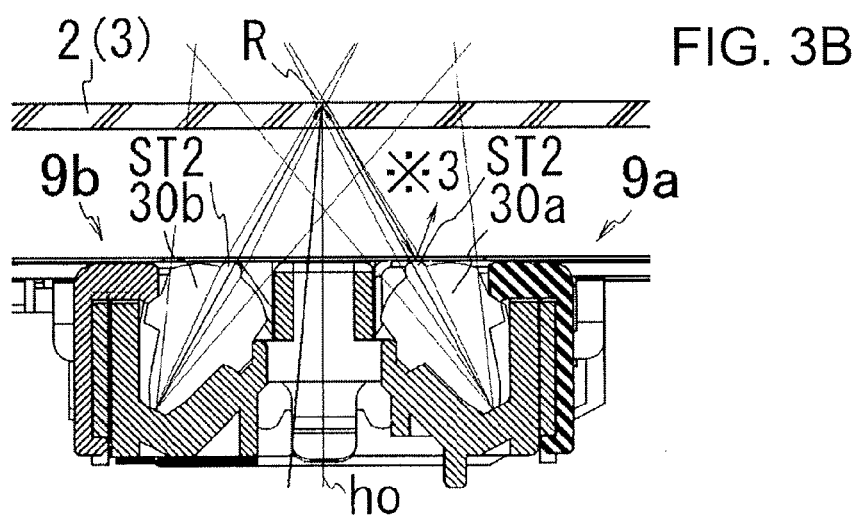
Figure 3C:
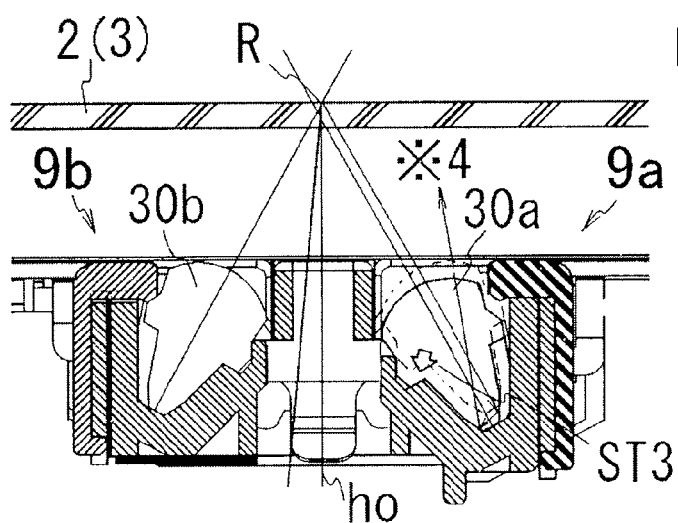

A reading aperture 34 corresponding to a reading line width W of the document sheet is formed in the illumination unit 9 housed in concave portion of the unit frame as illustrated in FIGS. 2 and 4. The light reflected from the reading surface of the document sheet which is irradiated with the light from the illumination unit 9 is passed through this reading aperture 34 and received by the line sensor 8 provided in the unit frame 11. The unit frame 11 is movably supported by the guide shaft 12 and rail member GL so as to allow the reading carriage 6 to be reciprocated at a predetermined stroke.

Although being described later in detail as an illumination device of the invention, the illumination unit 9 is constituted by a linear light source that emits linear light along the reading aperture 34, detachably mounted in the concave portion of the unit frame 11 by screws and the like for the purpose of facilitating maintenance of an illumination system, and irradiates the document sheet placed on the platen to be described later with reading light through the reading aperture 34.

The reflecting mirror 10 includes a plurality of mirrors so as to form a light path having a predetermined length. In the present embodiment, the reflecting mirror 10 includes six mirrors. The first mirror 10a reflects the reflected light from the document surface of the document sheet toward the second mirror 10b, and the second mirror 10b reflects the reflected light from the first mirror 10a toward the third mirror 10c. Further, the third mirror 10c reflects the reflected light from the second mirror 10b toward the second mirror 10b once again, the second mirror 10b reflects the reflected light from the third mirror 10c toward the fourth mirror 10d, and the fourth mirror 10d reflects the reflected light from the second mirror 10b toward the fifth mirror 10e. Finally, the fifth mirror 10e guides the reflected light from the fourth mirror 10d to the sixth mirror 10f, and the sixth mirror 10f guides the reflected from the fifth mirror 10e to the condenser lens V. The light path of the reflected light of the document image is not limited to this. For example, it is possible to use only two mirrors (e.g., first and second mirrors) for formation of the light path.

Figure 26:
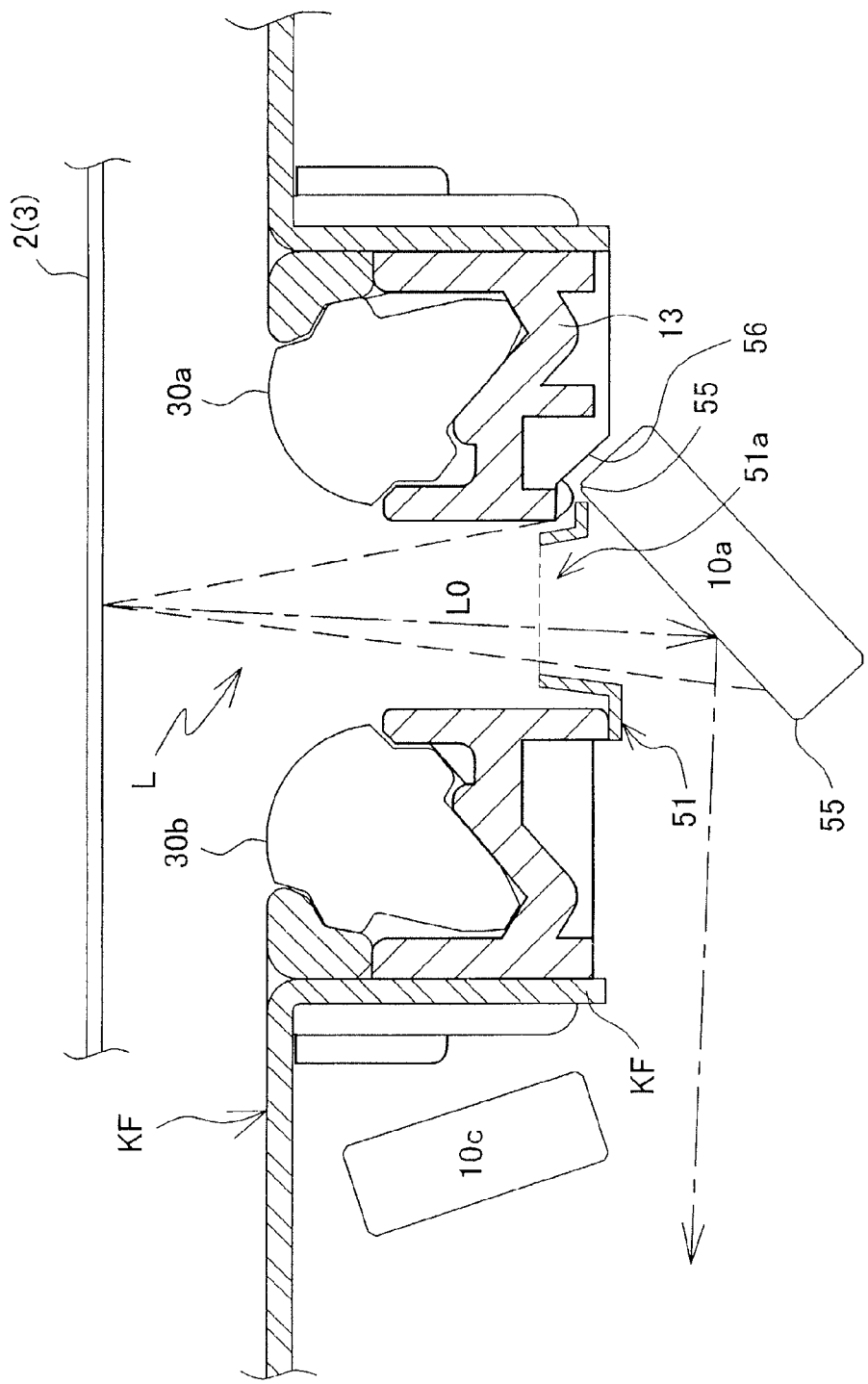
FIG. 26 is an enlarged view illustrating arrangement of a light guide holder and a first reflecting member in the reading carriage of FIG. 2.

As illustrated in FIG. 26, the first mirror 10a has a first reflecting surface that receives first the reflected light of the document image that passes through a gap between first and second housing portions 13a and 13b of the light guide housing portion 13. Although not illustrated, a chamfered portion 55 is formed in each of corner portions of each of the first to six mirrors 10a to 10f for safety's sake. The chamfered portion 55 is a plane having a different inclination from the reflecting surface of the mirror, so that if the reflected light of the document image enters the chamfered portion 55, the light may enter once again the document image surface from the chamfered portion, causing the light to be irregularly reflected inside and outside the carriage. Even when the chamfered portion is not formed, there is a possibility that the light is irregularly reflected at the corner portion of the mirror to adversely affect the reading light path L. In order to prevent this, the corner portion of the first mirror 10a nearest the document image is brought close to the document image side to be located at a position upward from the bottom surface of the first housing portion 13a of the light guide housing portion 13. That is, a cut portion 56 is formed on a side of the first housing portion 13a of the light guide housing portion 13 that is opposite to the document image side, and the chamfered portion 55 of the first mirror 10a is disposed so as to be housed in the cut portion 56. With this configuration, a lower portion of the first housing portion 13a serves as a light shielding portion. The light shielding portion is formed on a side opposite to a traveling direction of the light on the light path L passing through the pair of light guide housing portions 13 and houses the chamfered portion or corner portion of the first mirror 10a that faces the illumination unit 9. As a result, reflected light of the document image is shielded by the light guide housing portion 13 to prevent the reflected light from entering the chamfered portion 55. This in turn prevents the irregularly reflected light from occurring at the chamfered portion to thereby prevent deterioration of reading quality. Further, attachment of the corner portion of the first mirror 10a on the reflecting surface side that is nearer the reading surface at a concave portion of the light guide housing portion 13 allows the first mirror to be disposed nearer the light guide housing portion 13, thereby reducing a thickness of the unit frame 11.

The bottom portions of the pair of first and second housing portions 13a and 13b of the light guide housing portion 13 are positioned in a direction more away from the document image surface than the reading aperture 34, allowing the reflected light of the document image passing through the reading aperture 34 to be guided to the reflecting surface of the first mirror 10a. In this regard, by providing a condenser frame 51 which is formed separately from the light guide housing portion 13 in the reading aperture 34 on a side thereof away from the document image surface and which has an aperture portion 51a for narrowing an irradiation range of the reflected light as illustrated in FIG. 26, it is possible to prevent the reflected light of the document image from entering the chamfered portion 55 of the first mirror 10a. Further, in the present embodiment, the reflection light path L is not formed on a back side of the first mirror 10a. That is, the formation of the light shielding portion allows the light guide housing portion 13 and first mirror 10a to be continuous with each other to eliminate a gap therebetween. This can effectively prevent leakage of light to the line sensor 8.

The condenser lens 7 includes a single or a plurality of concave-convex lenses and condenses the reflected light from the document surface of the document sheet which is transmitted through the reflecting mirror 10 and forms an image on the line sensor 8.

The line sensor 8, which is a CCD or a C-MOS, includes photoelectric conversion sensor elements arranged on a line, and receives the reflected light of the document image transmitted from the condenser lens 7 for photoelectric conversion. The line sensor 8 used in the present embodiment includes a color line sensor, in which four lines of sensor elements constituting respective pixels of R (Red), G (Green), B (Blue), and BW (Black and White) are arranged in parallel lines. The line sensor 8 having such a configuration is mounted to a sensor circuit board 45, and the sensor circuit board 45 is fixed to the unit frame 11.

<Support Mechanism of Reading Carriage>

Figure 5:
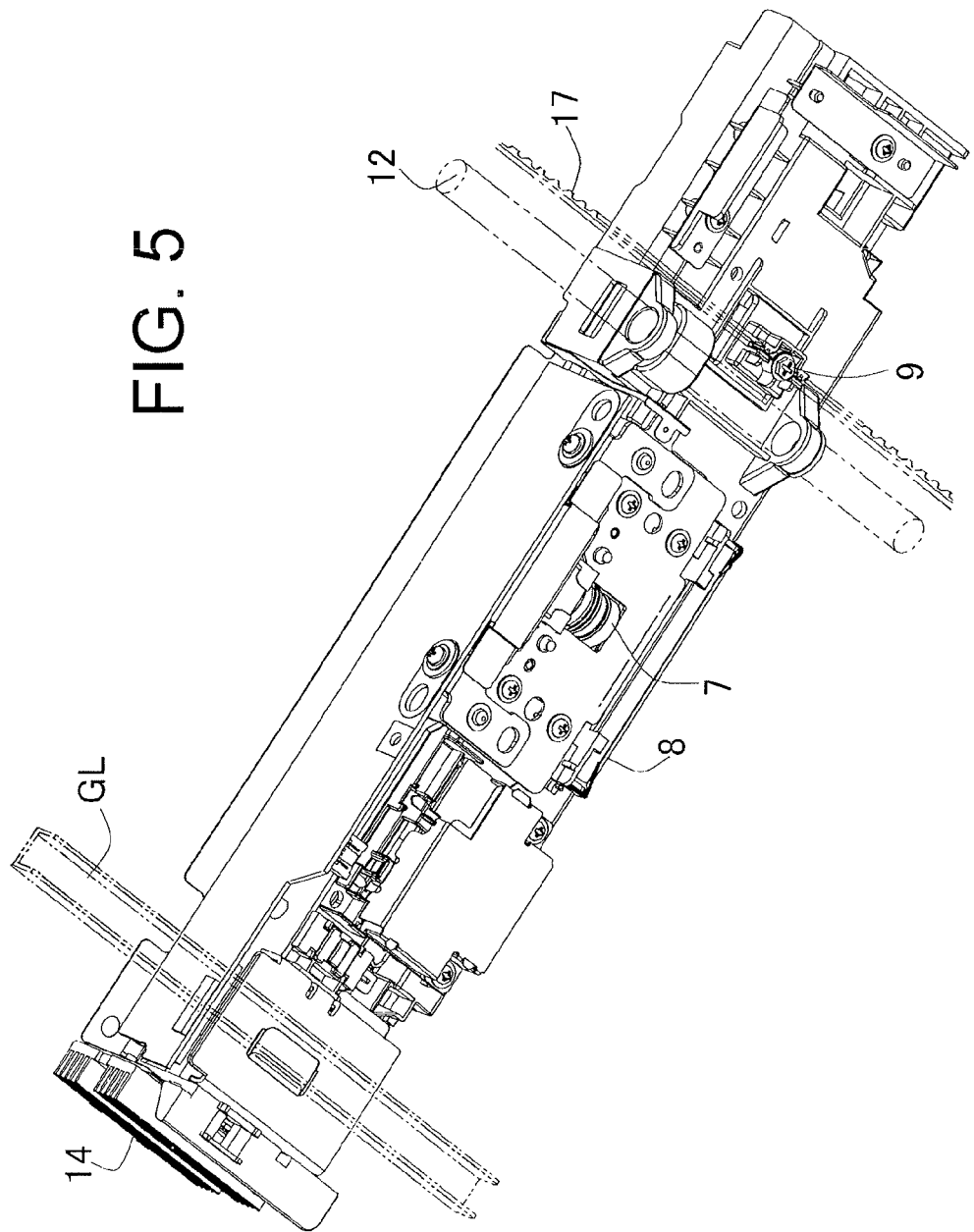
FIG. 5 is a perspective view of the outer structure of the carriage of FIG. 4, as viewed from below.
Figure 6:
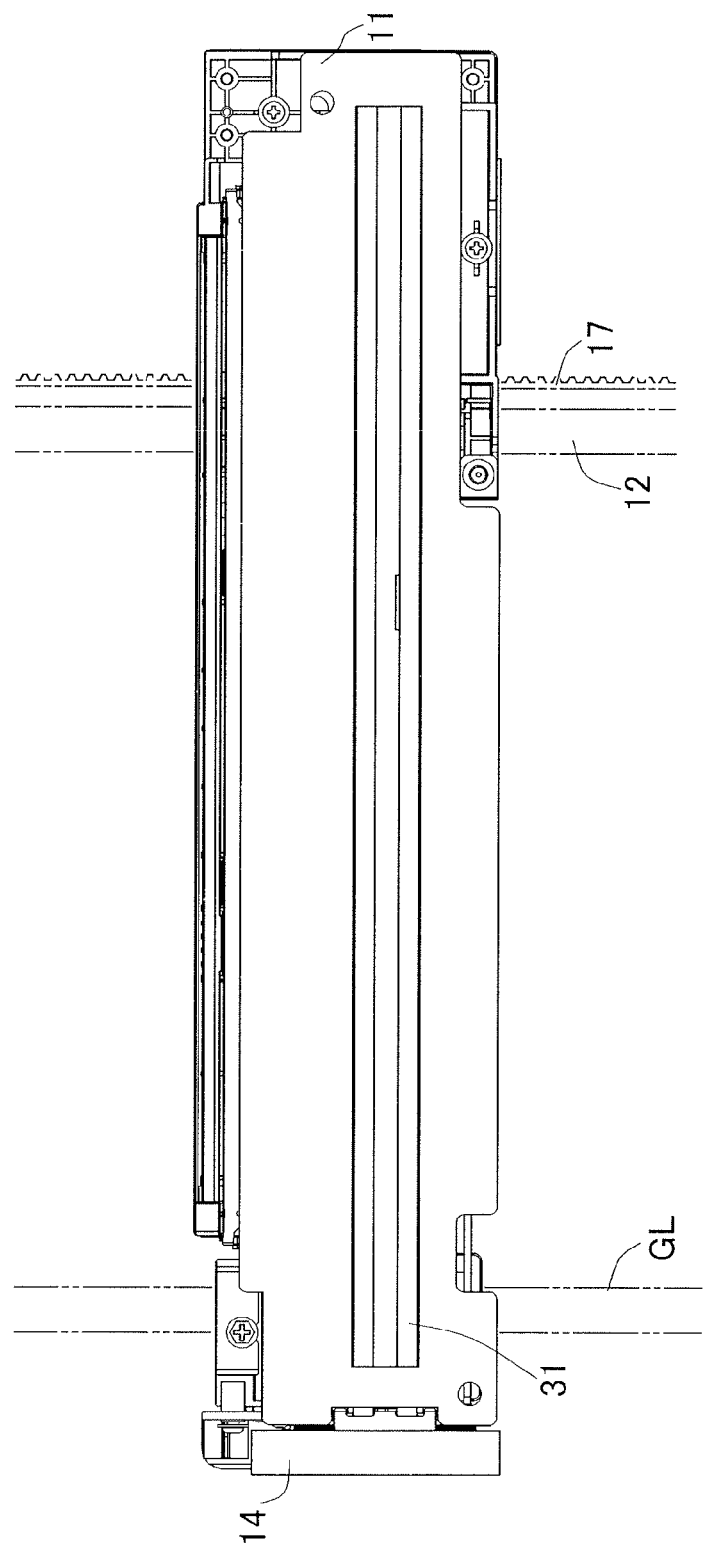
FIG. 6 is a plan view of the outer structure of the carriage of FIG. 4, as viewed from above.

As illustrated in FIGS. 4 to 6, the reading carriage 6 is supported so as to be freely reciprocated with respect to the device housing 1 with one end thereof supported by the guide shaft 12 and the other end thereof slidably supported on the rail member GL. A carriage support mechanism includes the guide shaft 12 and rail member GL extending in parallel to the device housing 1. Further, the carriage support mechanism is mounted parallel to both flat surfaces of the first and second platens 2 and 3, so as to allow the reading carriage 6 to be stably reciprocated at a position facing the flat surfaces of the first and second platens 2 and 3 in parallel thereto.

<Movement Mechanism of Reading Carriage>

A carriage movement mechanism of the reading carriage 6 includes the carriage motor Mc (FIG. 1) which is a drive motor such as a pulse motor or an encoder-equipped DC motor, a tractive member 17, such as a wire or a timing belt, that is rotated by receiving reciprocative rotation of the carriage motor Mc, and a pair of pulleys 46a and 96b rotatably supported by the device frame 1. The forward/reverse rotatable carriage motor Mc is connected to the pulley 46b, the tractive member 17 is provide in a tensioned state between the pair of pulleys 96a and 46b, and the reading carriage 6 is connected to the tractive member 17, thereby achieving the carriage movement mechanism.

<Reading Operation of Reading Carriage>

At power-on time or reading completion time, the reading carriage 6 connected to the above-described carriage movement mechanism is stopped at a home position HP (FIG. 1), i.e., a position where a not illustrated shading plate having a predetermined range of reference white (and reference black, as needed) for regulating light intensity characteristics is provided above the home position HP and is illuminated by the light from the illumination unit 9. Depending on the selected mode, the reading carriage 6 changes its position for reading operation. That is, when the document pass-through reading mode is selected, the reading carriage 6 moves from the home position HP to a position denoted by a continuous line of FIG. 1; and when the document fixed-reading mode is selected, the reading carriage 6 moves from the home position HP to a position denoted by a long dashed double-short dashed line of FIG. 1.

<Configuration of Illumination Device>

Next, the illumination device mounted to the above-described reading carriage 6 and used as the illumination unit 9 will be described based on FIG. 7 to FIG. 22.

Figure 10:
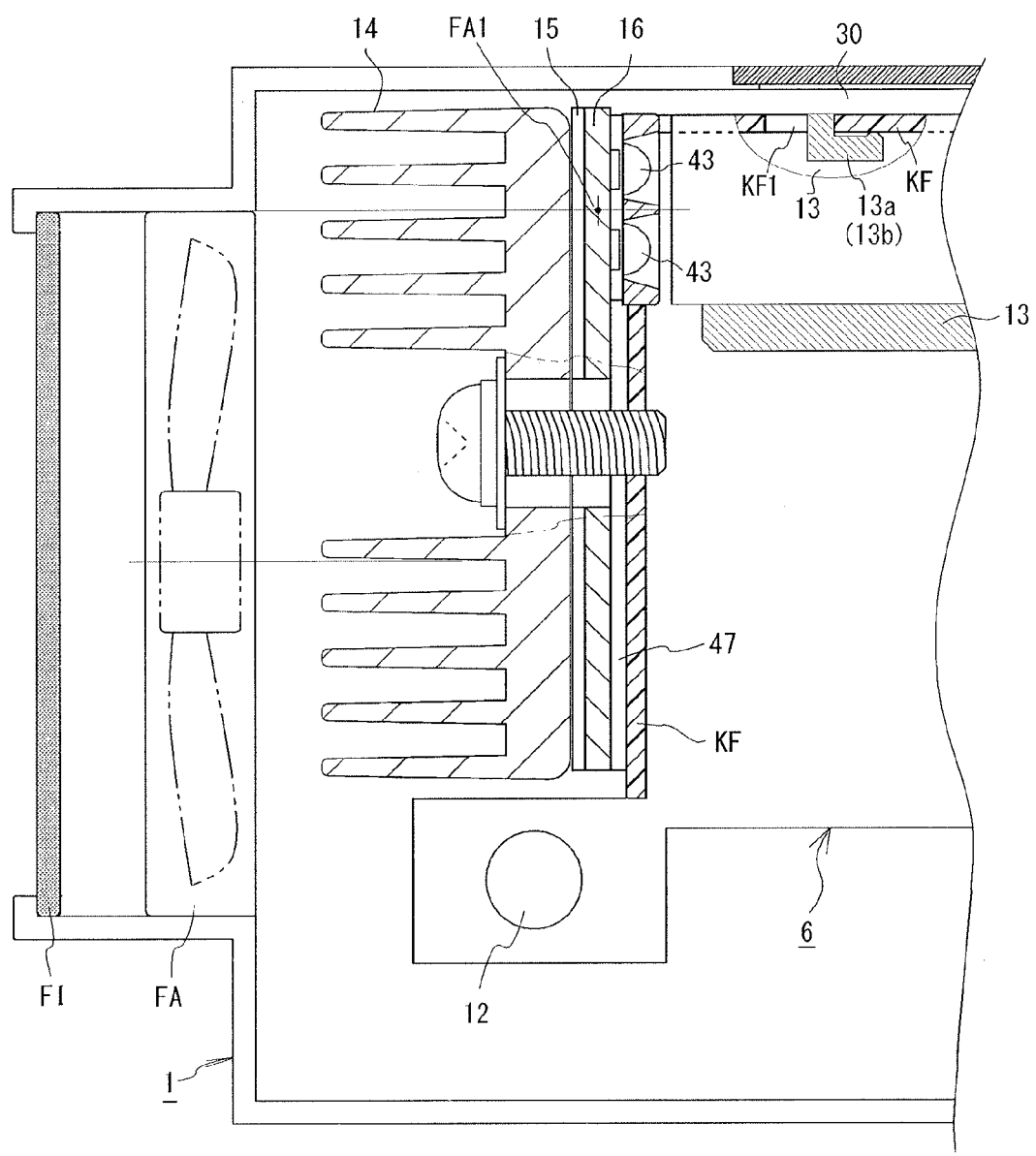
FIG. 10 is a simple side view for explaining a positional relationship between a cooling fan of FIG. 8 and illumination device mounted on the carriage.
Figure 11:
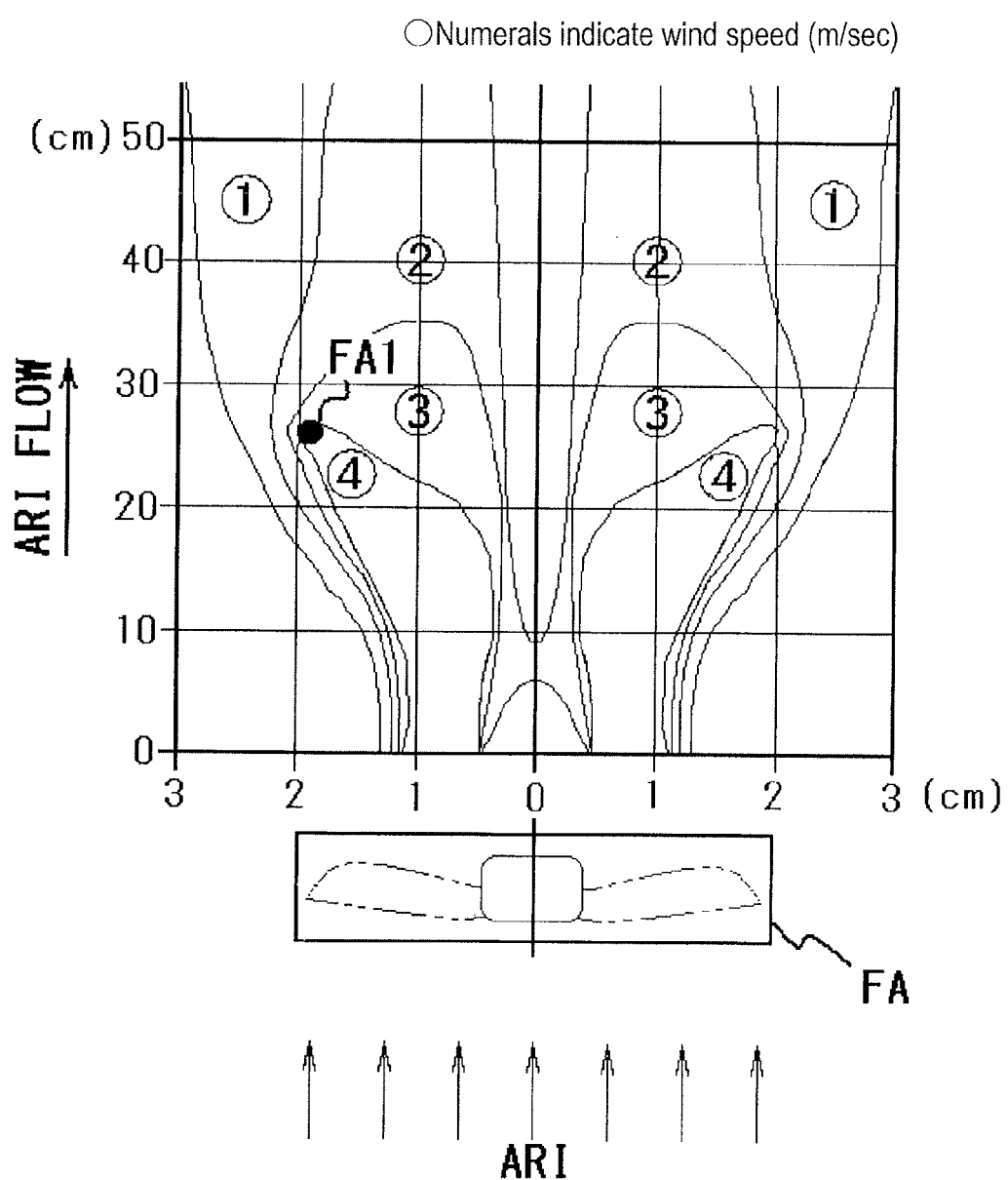
FIG. 11 is a graphic showing wind speed characteristics of the cooling fan used for the illumination device of FIG. 8.
Figure 12:
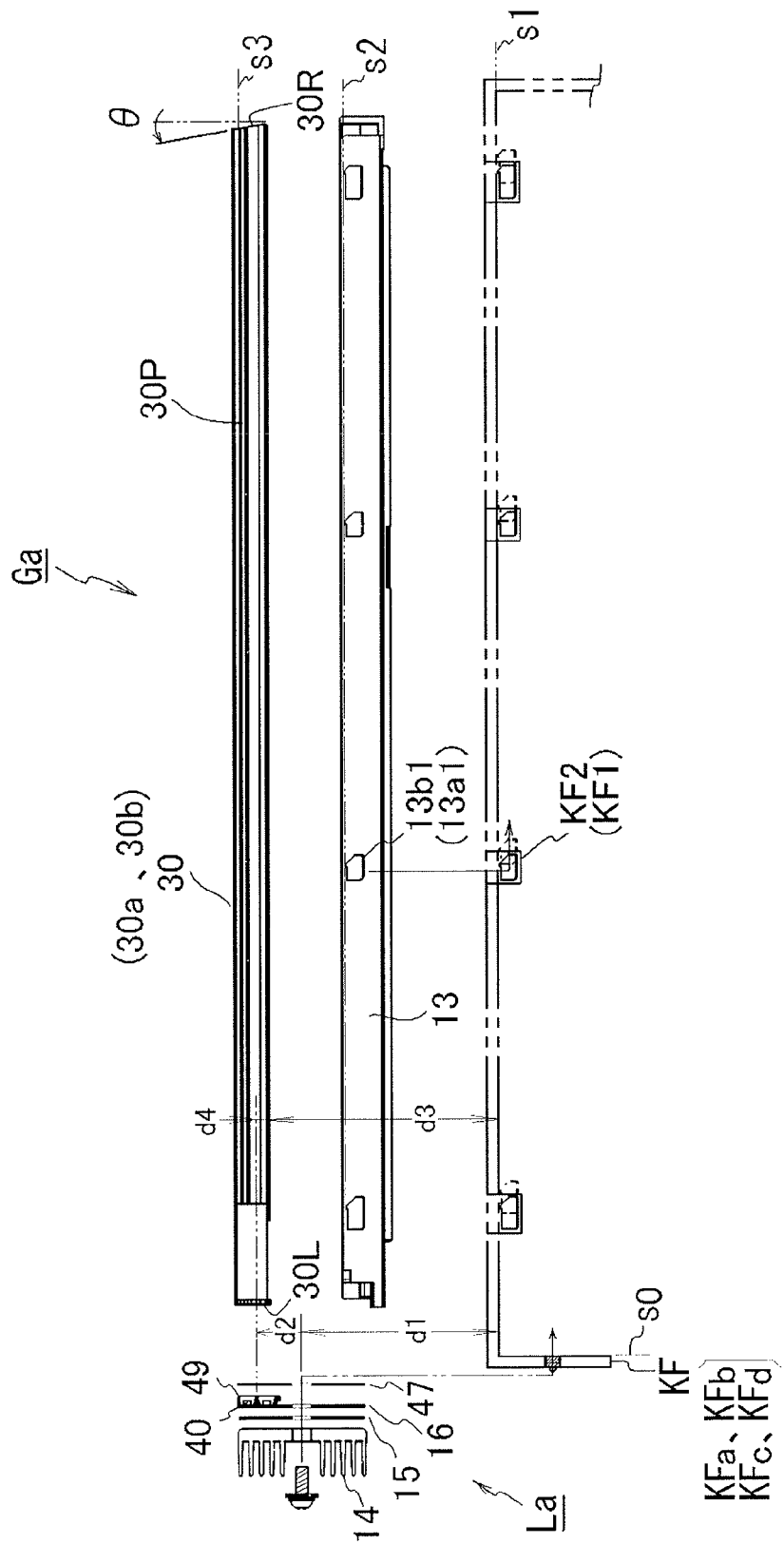
FIG. 12 is a main part exploded perspective view of the illumination device to be mounted on the carriage of FIG. 4.

The illumination unit 9 constituting the illumination device emits linear light along a reading line perpendicular to a reading surface R of FIG. 2, having a reading width in the main scan direction. As illustrated in FIGS. 7 to 15, the illumination unit 9 includes a light guide unit Ga and a light source unit La. The light guide unit Ga includes the first and second illumination units 9a and 9b illustrated in FIG. 2. The first and second illumination units 9a and 9b are housed in the respective first and second housing portions 13a and 13b formed in the light guide housing member (light guide holder) 13 held by the rigid body KF which is formed of metal through light guide retaining members T1 and T2 and which is fixed by screws and the like to the unit frame 11 of the carriage 6 illustrated in FIG. 2. As illustrated in FIG. 12, one end of each of the first and second illumination units 9a and 9b is disposed so as to face each of luminous bodies 40 of the light source unit La supporting the luminous bodies 40. Hereinafter, a configuration of the light source unit La and that of the light guide unit Ga will be described.

<Configuration of Light Source Unit>

Figure 7:
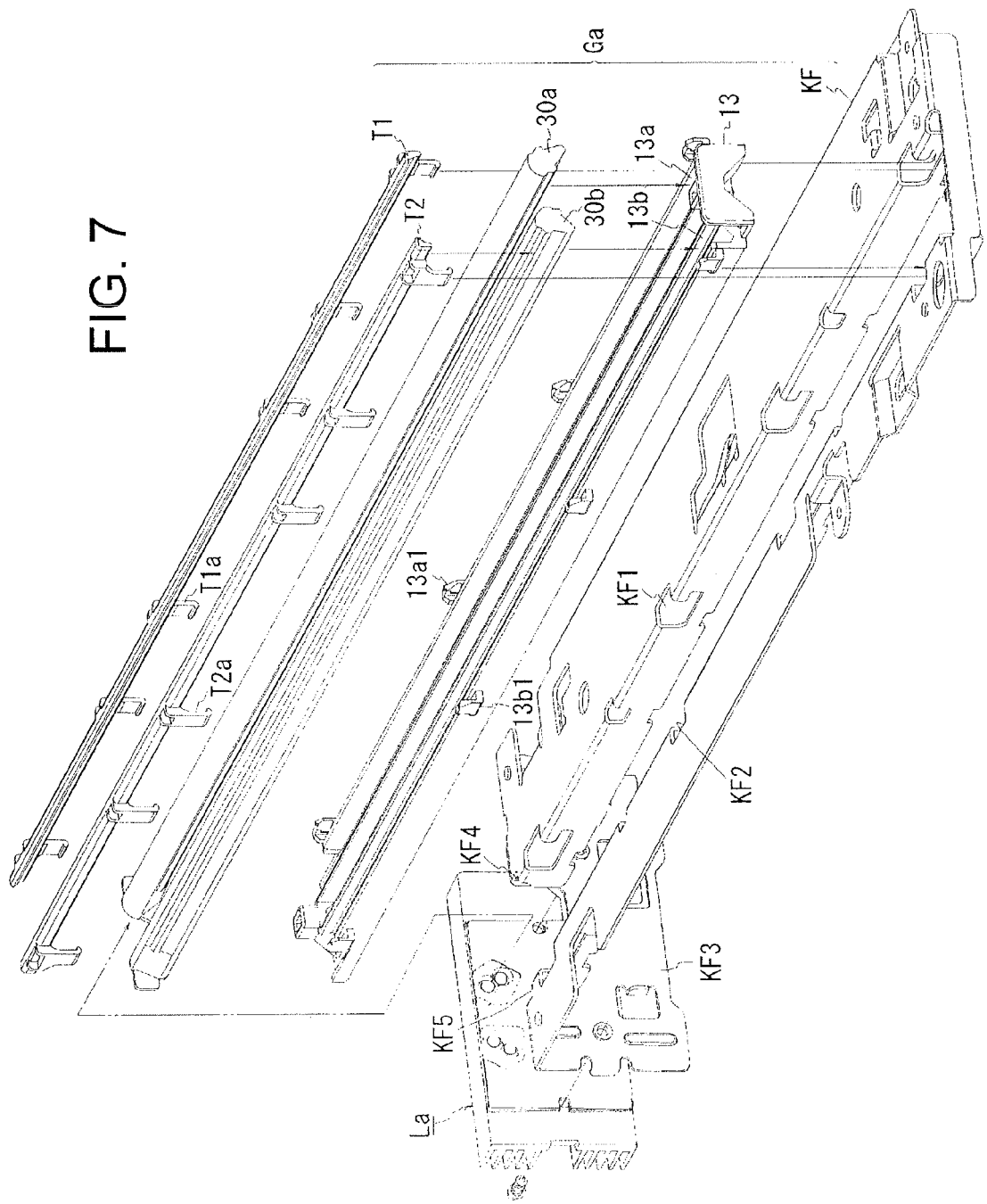
FIG. 7 is an exploded perspective view of an illumination device to be mounted on the carriage of FIG. 4.
Figure 8:
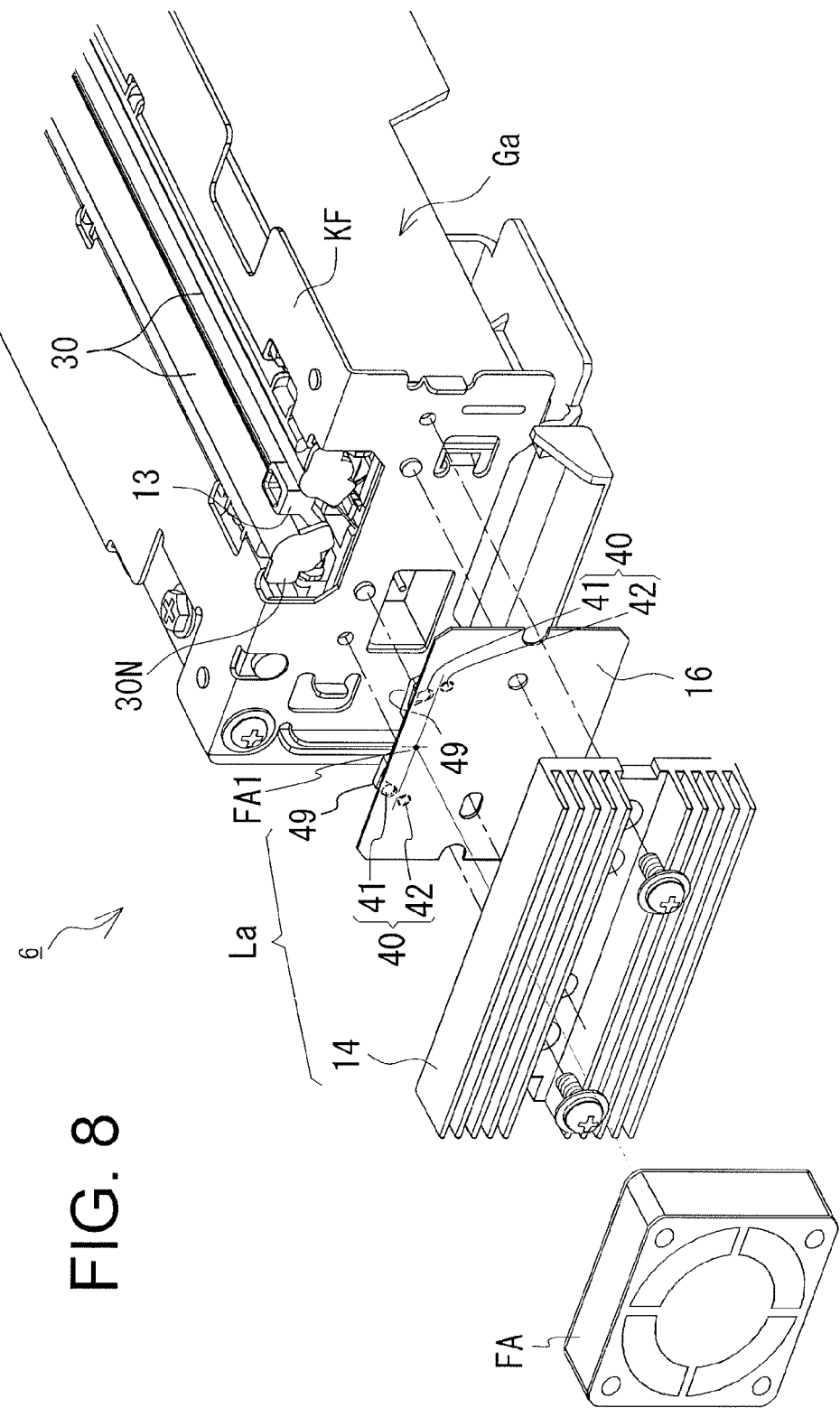
FIG. 8 is an exploded perspective view illustrating, in an enlarged manner, a main part of the illumination device of FIG. 7.
Figure 13:
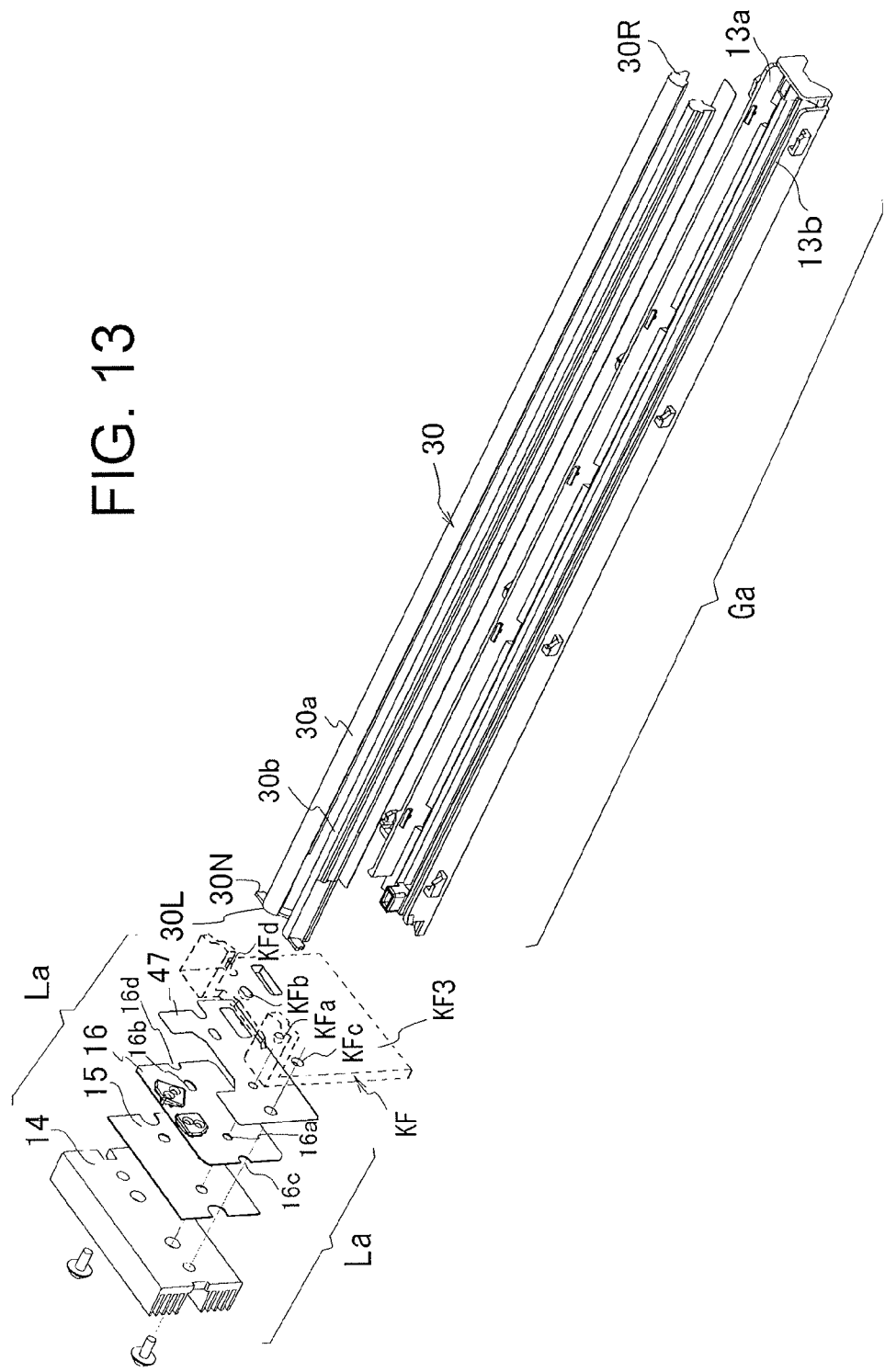
FIG. 13 is a main part exploded perspective view of the illumination device of FIG. 12.

As illustrated in FIG. 13, the light source unit La includes a heat radiating member 14, a heat conductive sheet 15, a circuit board 16, and an insulating Mylar 47 and is mounted by screws and the like to the rigid body formed of metal or a material equivalent to metal illustrated in FIG. 7. There are mounted to the circuit board 16 a first luminous body (white LED) 41 and a second luminous body (white LED) 42. Lens caps 43 are attached respectively to the first and second luminous bodies 41 and 42, and the resultant first and second luminous bodies 41 and 42 are covered with a reflector 49 from above. The insulating Mylar 47 provides insulation to a portion other than that covered with the reflector 49. Hereinafter, descriptions will be given of respective components and assembly of the unit.

(Luminous Body)

Figure 20A:
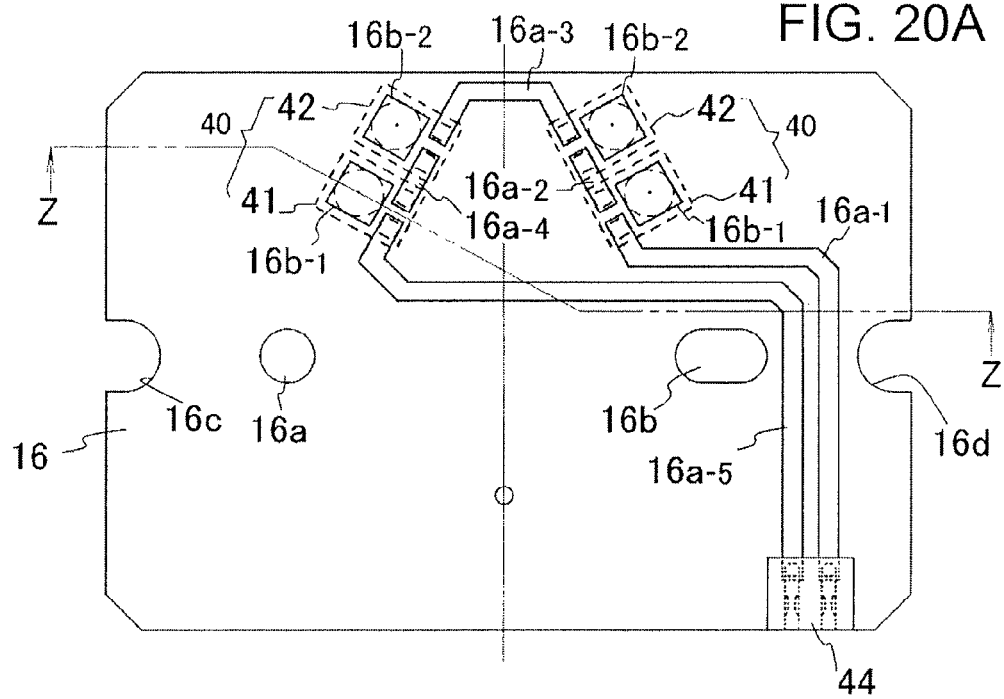

The luminous body 40 will be described based on FIGS. 17 to 20. The luminous body 40 includes left and right pair, each of which includes two light emitting elements: a first luminous body 41 and a second luminous body 42. The light emitting elements are each formed of a white LED chip. Further, as illustrated in FIG. 20C, the luminous body 40 has an anode 40a and a cathode 40b which are formed for power delivery and a thermal pad 40 for heat radiation and is electrically mounted on a wiring pattern of the circuit board 16.

(Circuit Board)

Figure 20B:
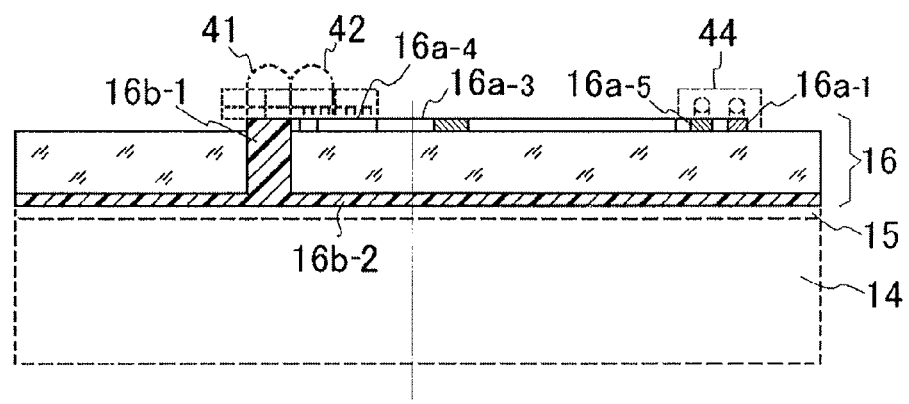
Figure 20C:
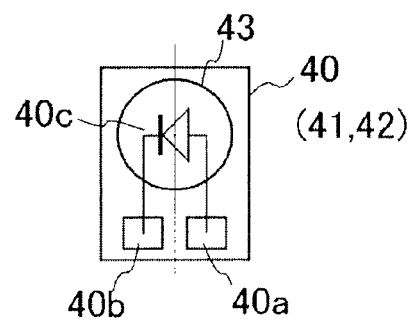

The circuit board 16 on which the luminous body 40 is mounted is, as illustrated in FIG. 20B, fixed to the heat radiating member 14 through the heat conductive sheet 15, and the luminous body 40 is mounted on the circuit board 16. As illustrated in FIG. 20A, there are formed, on a front surface of a substrate of the circuit board 16, wiring patterns 16a-1 to 16a-5 each of which is formed of a material excellent in conductivity, such as copper, silver, or gold, for energizing the luminous body 40 for light emission. A rear surface of the substrate of the circuit board 16 is covered with a heat conductive layer 16b-2 formed of a material excellent particularly in heat conductivity, such as copper, silver, or aluminum. In addition, there is formed, on the substrate front surface of the circuit board 16, a projecting portion 16b-1 so as to bring a part of the heat conductive layer into direct contact with an emission source of the luminous body 40. The circuit board 16 is formed as follows. That is, a through hole for forming the projecting portion 16b-1 is formed on an insulating substrate formed of an epoxy material, a heat conductive material excellent particularly in heat conductivity, such as copper, silver, or aluminum is injection-molded to form the heat conductive layer 16b-2 and projecting portion 16b-1 on a rear surface of the insulating substrate, a layer formed of a material excellent in conductivity, such as copper, silver, or gold is formed on a front surface of the substrate, and the substrate front surface is etched to leave the wiring patterns 16a-1 to 16a-5 and projecting portion 16b-1. Then, when the luminous body 40 is mounted on the circuit board 16, the thermal pad 40c of the luminous body 40 and projecting portion 16b-1 projecting from the rear surface of the substrate are brought into press contact with each other, allowing heat generated at lighting time of the luminous body 40 to be radiated to the heat conductive layer 16b-2 on the rear surface of the substrate through the projecting portion 16b-1 contacting the thermal pad 40c.

The circuit board 16 can be formed in a multi-layer structure; in this case, however, it is desirable that the heat conductive layer 16b-2 on the rear surface and projecting portion 16b-1 projecting to the substrate front surface are connected to each other so as to maintain high heat conductivity. Further, heat of the luminous body 40 may be conducted to the heat radiating member 14 through the anode 40a and cathode 40b.

(Heat Conductive Sheet)

The heat conductive sheet 15 is formed of an elastic sheet material made of insulating synthetic resin containing thermoplastic elastomer or non-silicon based thermoplastic resin, having high heat conductivity and excellent in elasticity. As illustrated in FIG. 13 and as denoted by a dashed line of FIG. 20B, the heat conductive sheet 15 is interposed between the circuit board 16 and heat radiating member 14 to be described later so as to efficiently conduct the heat of the luminous body 90 which has been conducted to the heat conductive layer 16b-2 of the circuit board 16 to the heat radiating member 14.

(Heat Radiating Member)

The heat radiating member 14 is commercially available as a heat sink and is formed of a metal material, such as an aluminum alloy, excellent in heat conductivity. The heat radiating member 14 has a plurality of projecting plate-like fins in order to increase a surface area thereof as illustrated in FIG. 15 and thus efficiently radiates heat of the luminous body 40 that has been conducted thereto through the above-described heat conductive sheet 15. Further, a cooling fan FA for blowing cooling air to the heat radiating member 14 for cooling purpose is disposed at a position of the reading carriage 6 in the document pass-through reading mode, which is denoted by a continuous line of FIG. 1.

(Cooling Fan)

Figure 9:
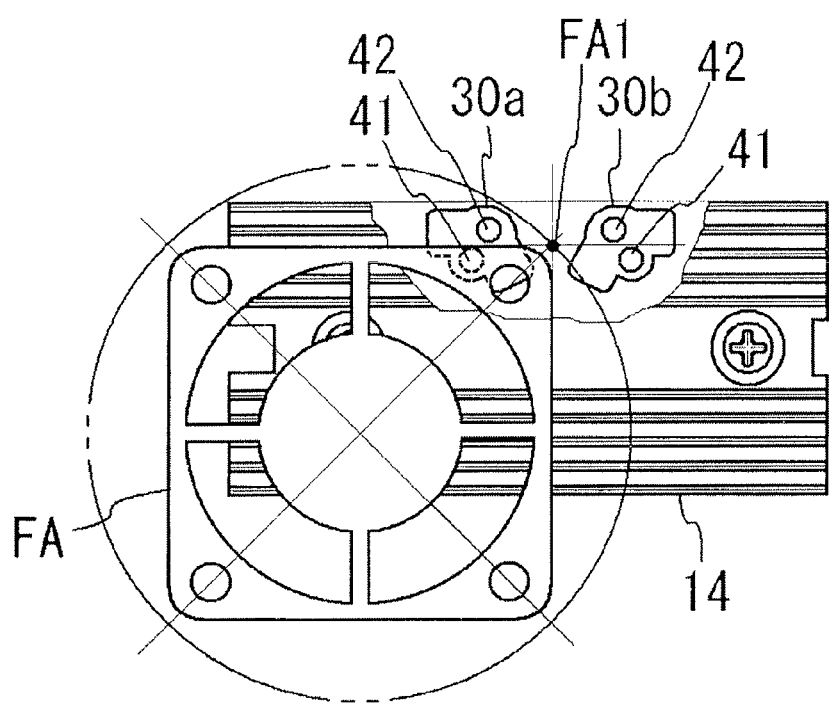
FIG. 9 is a front view of the illumination device of FIG. 8 as viewed from a cooling fan side.

The cooling fan will be described based on FIGS. 8 to 11. When the document pass-through reading mode is selected to cause the reading carriage to be moved to the position denoted by the continuous line of FIG. 1, the cooling fan FA and heat radiating member 14 face each other. To enhance cooling efficiency, the cooling fan FA and heat radiating member 14 have a positional relationship illustrated in FIG. 9. That is, as illustrated in FIG. 9, a point FA1 at which a wind speed is highest in wind speed characteristics of the cooling fan FA illustrated in FIG. 11 is positioned at substantially a center of the pair of luminous bodies 40. Actually, as illustrated in FIG. 11, a cooling fan FA having a size of 2 cm×2 cm is positioned such that the point FA1 and center of the pair of luminous bodies 40 coincide with each other. Further, as illustrated in FIG. 10, a part of the device housing 11n which the cooling fan FA is mounted protrudes from the device frame. A filter FI is disposed at a leading end of the protrusion portion, and the cooling fan FA is supported at a portion spaced apart from the filter FI by a predetermined gap. This allow a suction port of the cooling fan FA to ensure a certain amount of space irrespective of the installation condition of the image reading device to prevent suction efficiency of the cooling fan FA from being lowered.

(Insulating Myler)

As illustrated in FIG. 13, the insulating Myler 47 is provided on a surface of the circuit board 16 on the light guide 30 side. The insulating Myler 47 insulates the wiring pattern on the circuit board 16 from the metal member constituting the rigid body KF and protects the surface of the circuit board 16 from being damaged.

(Reflector)

Further, as illustrated in FIGS. 13 to 19, there is provided the reflector 49 that restricts spectral characteristics of the first and second luminous bodies 41 and 42 of the luminous body 40 to within 90° so as to allow the light from the luminous body 40 to enter the light guide 30 without loss. The reflector 49 is provided per one luminous body. The reflector 49 is formed of a material having high reflectivity, which is obtained by depositing metal such as aluminum to a plastic material and has an umbrella shape spreading from the luminous body 40 toward the light guide 30. The umbrella-shaped part may be formed in a curve surface or in an inclined flat surface.

(Isolation between Luminous Bodies by Reflector)

Figure 17:
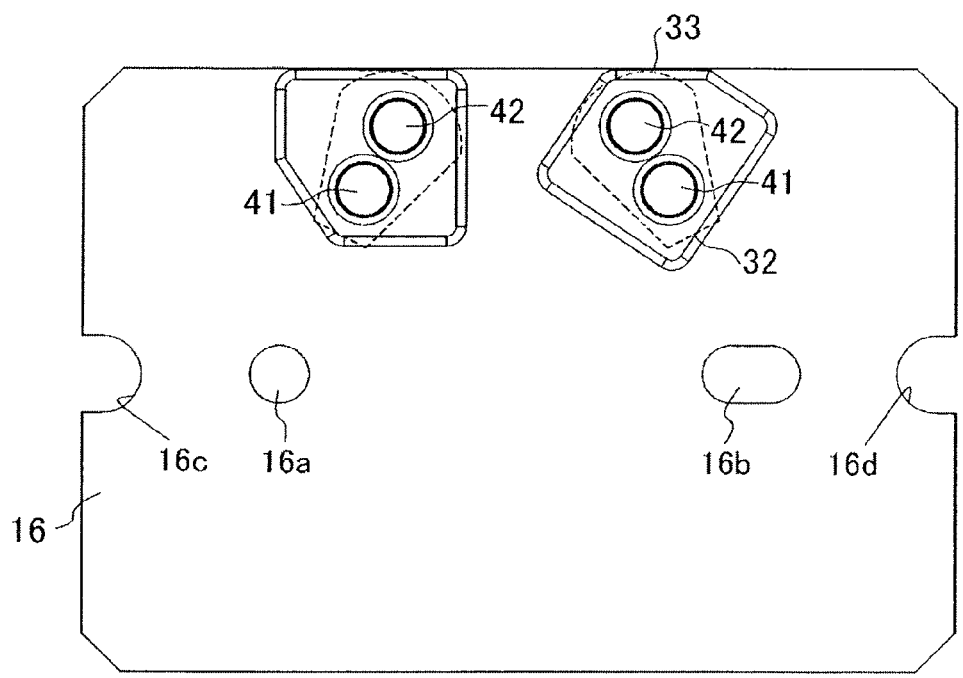
FIG. 17 is a plan view for explaining a light source unit in the illumination device of FIG. 13 as viewed from the light guide side.
Figure 18:
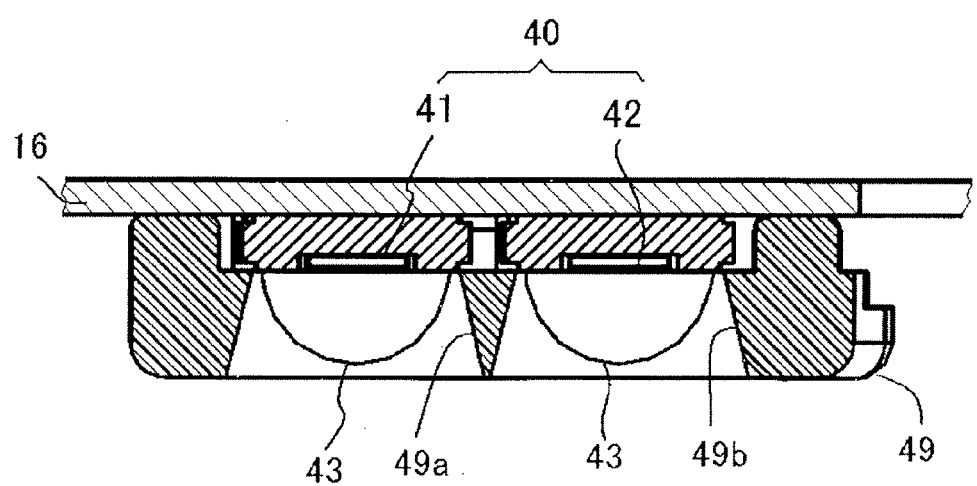
FIG. 18 is a cross-section enlarged view of the light source unit of FIG. 17.

Next, a supplementary description will be made of isolation between the luminous bodies by the reflector. As illustrated in FIGS. 17 and 18, the first and second luminous bodies 41 and 42 are configured such that light emission areas thereof are isolated from each other by the respective reflectors 49. By isolating the lights that enters the light guide 30 from one end face 30L thereof from each other, it is possible to individually restrict the spectral characteristics of each of the first and second luminous bodies 41 and 42 and thus to allow the light emitted from each of the first and second luminous bodies 41 and 42 having the optimally-restricted spectral characteristics to enter the end face of the light guide only from a region restricted by the reflector, thereby further reducing occurrence of the illumination spots.

<Assembly of Light Source Unit>

Figure 14A:
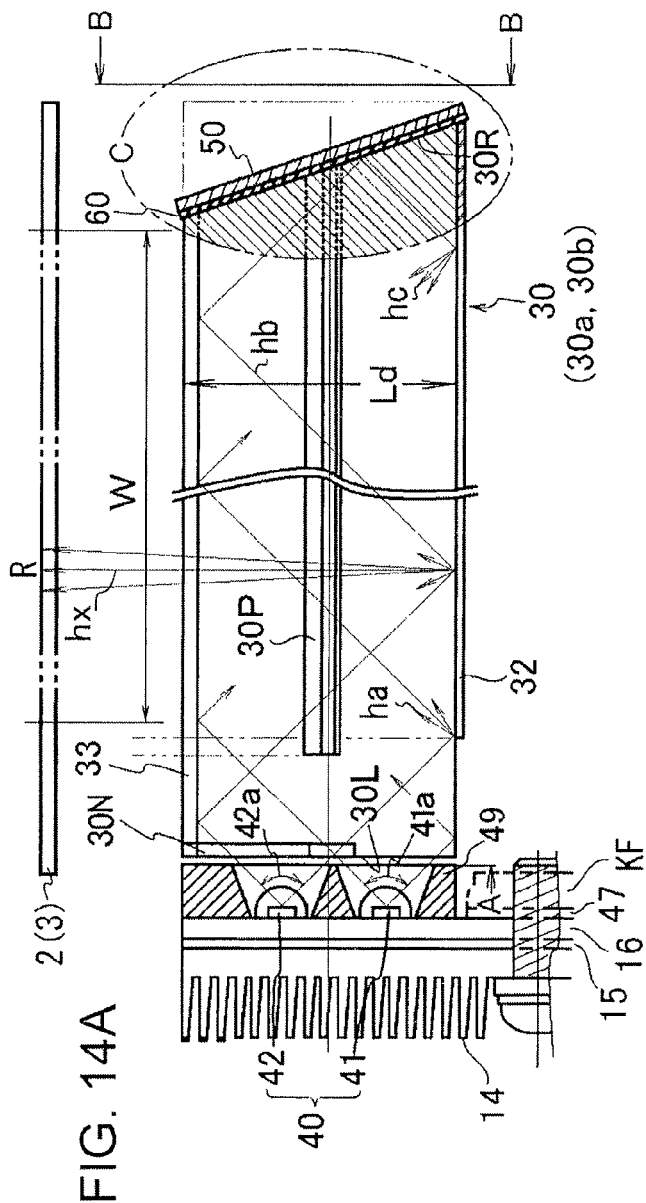

Assembly of the light source unit La will be described based on FIGS. 7 to 19. First, the luminous body 40 (41, 42) is mounted on the circuit board 16 as illustrated in FIGS. 17 to 19, and the lens cap 43 is attached to the luminous body 40 as illustrated in FIG. 19. The circuit board 16 is Lightly attached to the heat radiating member 14 (heat sink) through the heat conductive sheet 15 (heat resistant elastic plate) so as not to form an air space between the circuit board 16 and heat radiating member 14 as illustrated in FIG. 13, and then the heat radiating member 14 and rigid body KF are tightly fixed to each other by screwing as illustrated in FIG. 14A, whereby the circuit board 16, heat radiating member 14, and heat conductive sheet 15 are integrally fixed to the rigid body KF. Further, as illustrated in FIG. 7 and FIG. 17, the light incident surface 30L of the light guide 30 (30a, 30b) mounted to the rigid body KF supporting the heat radiating member 14 in a light guide unit assembly process and the luminous body 40 (41, 42) are mutually positioned with the reflector 49 interposed therebetween so as to face each other in a non-contact manner. Then, the rigid body KF supporting the resultant light source unit La is fixed by screws and the like to the unit frame 11 of the carriage 6, whereby mounting of the light source unit La on the carriage 6 is achieved. As a gap d between the light incident surface 30L of the light guide 30 (30a, 30b) and reflector 49 illustrated in FIG. 17, an air space of 0.5 mm to 1.0 mm is provided. This makes it difficult for the heat of the luminance body 40 (41, 42) to directly be transmitted or indirectly transmitted through the reflector 49 to the light guide 30 (30a, 30b), thereby preventing reduction in transmittance of the light guide 30 (30a, 30b) formed of transparent acrylic resin, epoxy resin, or the like caused in association with discoloration of the light incident surface 30L due to the heat of the luminous body 40 (41, 42).

<Configuration of Light Guide Unit>

Next, the light guide unit will be described based on FIGS. 7, 14, 15, 21, and 22. The light guide unit Ga has a symmetrical shape such that the light guide 30 (first light guide 30a, second light guide 30b) faces the luminous body 40 (41, 42) of the light guide unit. As illustrated in FIG. 7, the light guide unit Ga includes the light guide 30 (first light guide 30a, second light guide 30b), light guide housing member (light guide holder) 13, and light guide retaining member T (T1, T2) and is fixed to the rigid body KF supporting the light source unit La.

Figure 14C:
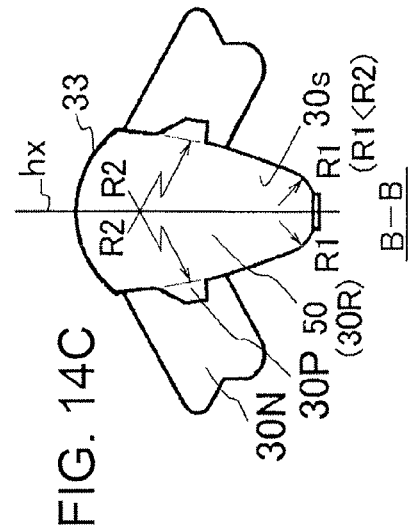
Figure 14B:
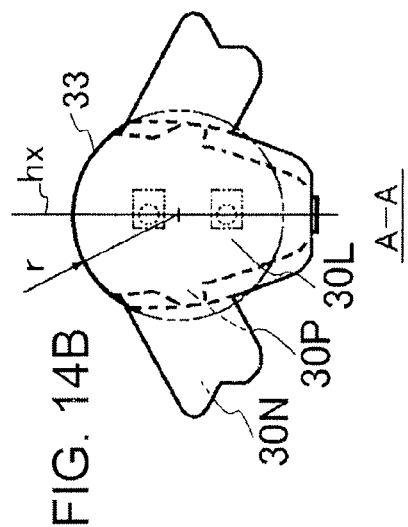

As illustrated in FIGS. 14 and 15, the light guide 30 is a rod-like translucent member formed into a rod-like shape extending in a longitudinal direction of the reading aperture 34 (see FIG. 4) by a length corresponding to the reading width (reading line width) W and having a light incident surface 30L that receives light from the luminance body 40, side surfaces 30S that face each other and extend in a longitudinal direction so as to reflect the incident light from the one end face 30L (light incident surface) to the other end face 30R in the longitudinal direction, a reflecting surface 32 that reflects the reflected light from the mutually facing side surfaces 30S in a direction crossing the longitudinal direction, a light exit surface 33 that emits the reflected light from the reflecting surface 32 as illumination light, a projecting portion 30P that projects at least from one of the side surfaces 30S and extends in the longitudinal direction, and a projecting piece 30N that projects from the light indent surface 30L in a fan-like form. The light guide 30 is formed of a material, such as transparent acrylic resin or epoxy resin, excellent in translucency. As illustrated in FIG. 14A, the reflecting surface 32 and light exit surface 33 are formed so as to face each other with a distance Ld and extend substantially in parallel to each other by a length corresponding to the reading line width W. The reflecting surface 32 and light exit surface 33 are connected to each other through the both side surfaces 30S. The luminous body 40 is disposed so as to face the light incident surface 30L. There is attached, to the other end face 30R, a reflecting plate 50 subjected to mirror surface treatment and having an outer surface with a reflecting layer formed of a material, such as aluminum or silver, having high reflectivity by an adhesive material (double-faced tape) 60 having a light transmittance of 90% or more so as to allow the outer surface to serve as a reflecting surface.

<Reflecting Surface>

Figure 15A:
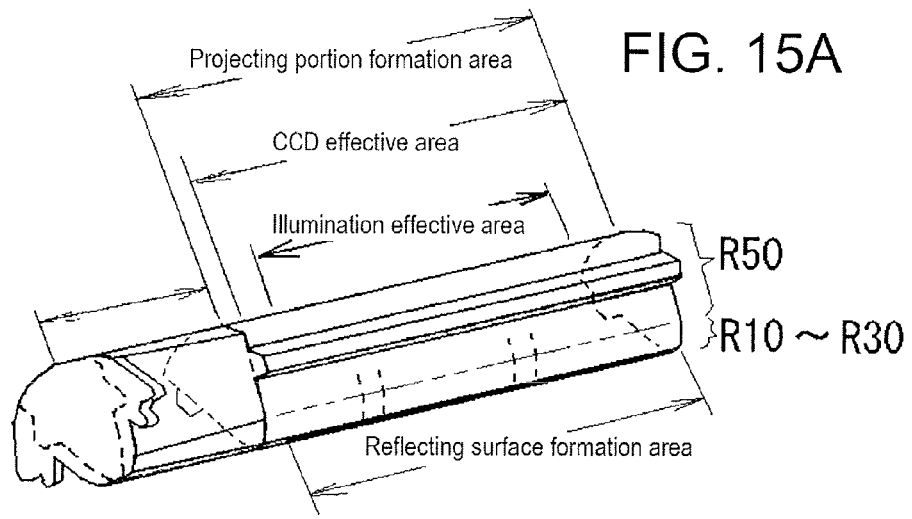
Figure 15B:
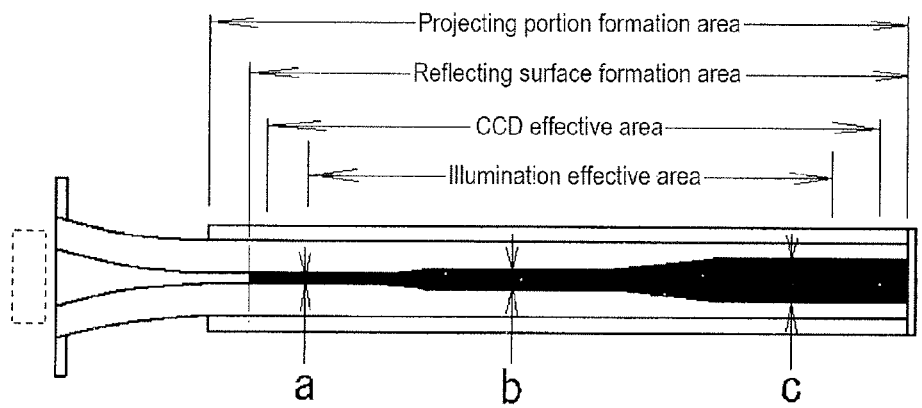

As illustrated in FIG. 15B, the reflecting surface 32 forms a pattern surface having a width sequentially increasing, as a→b→c, from the one end face (light incident surface) 30L side to the other end face 30R side. The reflecting surface 32 is formed into an uneven surface by performing coating, etching, or molding of reflective paint such as urethane-based white ink and is subjected to surface treatment so as to irregularly reflect introduced light. This surface treatment is not applied to a side near the light incident surface 30L of the light guide 30 as illustrated in FIGS. 14 and 15 but applied to a range from a portion spaced apart from the light incident surface 30L by a predetermined distance to the other end face 30R. In addition, as illustrated in FIG. 14A, a base end portion of the surface treatment portion on the light incident surface 30L side is positioned between a base end portion of the reading line width W and a base end portion of the projecting portion 30P projecting from the side surface 30S on the light incident surface 30L side. That is, in order to make it easy for the light incident surface 30L of the light guide 30 to sufficiently take in the light of the light source unit La, a projecting width of the projecting portion 30P is utilized to gradually increase a gap between the facing side surfaces 30S from the base end portion of the projecting portion 30P projecting from the side surface 30S on the light incident surface 30L side, thereby achieving adequate intensity control. If the reading line width W and the surface treatment portion have substantially the same length, a peak of the light intensity of the reading line width W on the 30L side is shined to the 30R side, with the result that the light intensity on the end portion on the 30L side becomes insufficient. In the present embodiment, in order to solve the problem of this insufficient light intensity, the surface treatment portion is previously set longer so as to make the light intensity distribution adequate. A shape of the pattern surface is, as described later in detail in the description of the side surface, is formed by changing a curvature of a curved surface R10 constituting the side surface, and the width of the pattern surface is set slightly larger then an actual pattern surface in consideration of printing misalignment, etc.

<Light Exit Surface>

The light exit surface 33 of the light guide 30 is formed by a circumferential surface, as illustrated in FIG. 22. The circumferential surface has a radius of 3.7 mm±0.1 mm, and a center P1 thereof exists on a normal line hx which is a center line of an illumination optical system light path. As illustrated in FIG. 14A, of the light reflected at a surface of the reflecting surface 32 to be diffused, light reaching the light exit surface 33 at an angle equal to or smaller than a critical angle is emitted from the light exit surface 33 toward an irradiation surface R (reading surface). To this end, the reflecting surface 32 is positioned outside the circumferential range of the light exit surface 33, and the position of the reflecting surface 32 is set to a position spaced apart from the light exit surface 33 by 8.46 mm±0.1 mm on the normal line hx.

<Side Surface>

Figure 15C:
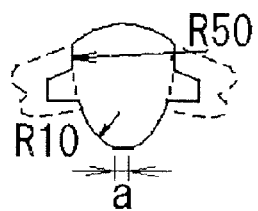
Figure 15D:
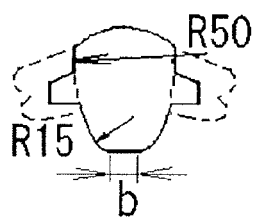
Figure 15E:
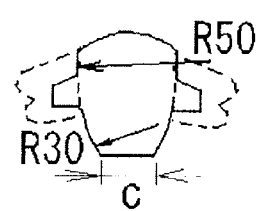

The side surfaces 30S of the light guide 30 on both side thereof are symmetric. Each of the side surfaces 30S has two or more varying curvatures and is formed by a curved surface obtained by connecting different curvatures without any edge. Specifically, as illustrated in FIGS. 15C to 15E, a curvature of a portion connected to the light exit surface 33 side is R50 (e.g., radius of 50 mm) which is constant in the longitudinal direction, a curvature of a portion connected to the reflecting surface 32 side is changed, in accordance with the widths (a, b, c) of the reflecting surface 32, sequentially from R10 (e.g., radius of 10 mm) to R15 (e.g., radius of 15 mm) and R30 (e.g., radius of 30 mm). This curvature change allows formation of the pattern surface having a width sequentially increasing, as a→b→c, from the one end face (light incident surface) 30L side to the other end face 30R side. By coating reflective paint such as urethane-based white ink to the pattern surface, the reflecting surface 32 can be easily formed.

<Shape of Side Surface>

A shape of the side surface 30S is designed so as to make it easy for the light incident surface 30L of the light guide 30 to sufficiently take in the light of the light source unit La. That is, as illustrated in FIGS. 15A and 15B, a projecting width of the projecting portion 30P is utilized to gradually increase a gap between the facing side surfaces 30S from the base end portion of the projecting portion 30P projecting from the side surface 30S on the light incident surface 30L side to obtain a trumpet shape (shape once narrowed from the end face toward the other end face and then expanded). The utilization of the projecting width of the projecting portion 30P for obtaining the trumpet shape (shape once narrowed from the end face toward the other end face and then expanded) eliminates the need to increase an allowable width of the light guide, thereby maintaining compactness of the device. Further, by increasing a reflection angle of the light incident from the light incident surface 30L toward the other end face 30R by utilizing the trumpet shaped (shape once narrowed from the end face toward the other end face and then expanded) curved surface, it is possible to increase reflection intensity of the light toward the other end face 30R, thereby facilitating the light intensity control for the other end face 30R side.

<Projecting Portion>

The projecting portion 30P projecting from the side surface 30S will be described based on FIGS. 14 and 15. The projecting portion 30P is formed as a flange-shaped projecting portion that projects from a center portion of the side surface 30S as illustrated. The projecting portion 30P is not formed at a portion near the one end face 30L. That is, the projecting portion 30P has its base end positioned between the base end portion of the reflecting surface 32 and light incident surface 30L and extends up to the other end face 30R. The reason that the projecting portion 30P is not extended up to the light incident surface 30L is that, if the projecting portion 30P is extended up to the light incident surface 30L, the light is irregularly reflected at the projecting portion 30P to adversely affect the spectral characteristics or the light goes outside from the light incident surface 30L to cause attenuation of the reflection intensity. The projecting portion 30P, which is continuously formed, is retained by the light guide retaining member T (T1, T2) when the light guide 30 (first light guide 30a, second light guide 30b) is housed in the light guide housing portion 13 (13a, 13b) to be described later for mounting to the rigid body KF, whereby eliminating warpage specific to the bar-like member caused in molding time of the light guide 30 or due to aging thereof.

<Reflecting Plate>

The reflecting plate 50 and adhesive material 60 provided on the other end face 30R of the light guide 30 are formed as a one sheet material. The adhesive material 60 is formed of an acrylic sheet material having a light transmission rate of 90% or more. The reflecting plate 50 serving as a sheet base material having the above-described reflecting surface is put on a front surface of the adhesive material 60, and a peel-off sheet having a not illustrated peel-off surface is put on a rear surface thereof, thereby forming one sheet material. Although a thickness of the sheet material constituted by the reflecting plate and adhesive material in the present embodiment is set to 25 μm, the thickness may be 25 μm or more as long as the light transmittance of 90% or more can be ensured. The sheet material conforming to an outer shape of the other end face 30R of the light guide is obtained by die-cutting, the peel-off sheet is peeled off from the adhesive material 60, and the reflecting plate 50 attached with the adhesive material 60 is attached to the other end face 30R of the light guide, whereby the reflecting plate attachment operation can be done with enhance workability. Only by attaching the reflecting plate 50 previously attached with the adhesive material 60 to the other end face 30R of the light guide, it is possible to reliably provide a certain gap corresponding to a thickness of the adhesive material 60 between the reflecting plate 50 and the other end face 30R of the light guide. As in the case where a predetermined gap is provided between the one end face of the light guide and luminous body, this gap is provided in order to make the reflecting plate 50 closer to a light emission environment of the luminous body. That is, by creating a pseudo light source more similar to the luminous body, it is possible to obtain light intensity as high as that obtained in the case where luminous body is provided on both end faces of the light guide, as well as, horizontally uniform spectral characteristics of the linear light.

Further, as illustrated in FIG. 15, by inclining the reflecting surface of the other end face 30R by an angle θ with respect to the normal line hx of the reflecting surface 32 in a length direction, the light intensity characteristics can be corrected. That is, as illustrated in FIG. 15, when the angle of the reflecting surface is inclined by θ in a clockwise direction, the light intensity at the both end face portions in the main scan direction increases; while when the angle of the reflecting surface is inclined by θ in a counterclockwise direction, the light intensity at the both end face portions in the main scan direction decreases. Previously setting this angle in a design stage of the light guide 30 allows easy matching with the spectral characteristics of the condenser lens 7. An optimum value of the angle is about 10°. Another configuration is possible in which the end portion of the light guide 30 on the pseudo luminous body side is not inclined, but the thickness of the adhesive sheet is changed to incline the other end portion 30R in a pseudo manner.

In the above description, the luminous body is provided at the one end face 30L of the light guide so as to face the one end face 30L with a predetermined gap, and the reflecting plate 50 is provided at the other end face 30R thereof. Alternatively, however, in place of the reflecting plate 50, there may be provided a luminous body having the similar configuration to the luminous body provided at the one end face of the light guide. In this case, the trumpet shape (shape once narrowed from the end face toward the other end face and then expanded) of the light guide is made symmetrical with respect to a center portion of the light guide formed at the other end side, whereby an illumination device similar to that according to the present embodiment can be achieved.

<Path of Reflected Light from Incident Face to Exit Face>

The light of the luminous body 40 introduced in the light guide 30 is diffused in a predetermine direction at the reflecting surface 32. The light introduced in the light exit surface 33 at an angle equal to or larger than the critical angle is reflected inside, while the light introduced at an angle equal to or smaller than the critical angle is emitted outside. The light denoted by an arrow ha in FIG. 14 is reflected inside the light guide 30 to be diffused in a direction along the reading line width W, and the light denoted by an arrow hb is emitted from the light exit surface 33 to the reading surface R. Although not illustrated, the luminous body 40 emits light in a semispherical direction (360° direction; in the illustrated example, 60° wide-angle direction). This emitted light propagates inside the light guide 30 from the one end portion 30L to the other end portion 30R while repeating reflection. In the course of the propagation, the light reflected by the reflecting surface 32 toward the light exit surface 33 side is emitted outside the light guide 30.

The light that has reached the other end face 30R after repeatedly being reflected inside the light guide 30 is reflected by the reflecting plate 50 attached to the surface of the other end face 30R through the adhesive material 60 to be returned to the luminous body 40 side, and the light denoted by an arrow ha irregularly reflected at the reflecting surface 32 is emitted from the light exit surface 33 to the reading surface R. By utilizing the above characteristic, the following effect can be obtained. That is, by adjusting the position of the luminous body 40 with respect to the light incident surface 30L so as to reduce the light to be emitted from the light exit surface 33 on the light incident surface 30L side to the reading surface R and increase the light to be reflected at the surface of the other end face 30R, thereby allowing a decrease in the light intensity on the light incident surface 30L side and an increase in the light intensity on the other end face 30R side. This allows the intensity of the light to be emitted to the reading surface R to be uniform and allows, when the condenser lens 7 of an optical reduction system type is used, the light intensity characteristics to be brought close to the light intensity distribution according to the cosine fourth power law which depends on the lens characteristics.

<Light Guide Housing Member (Light Guide Holder)>

The light guide housing member 13 that houses therein the light guide 30 will be described. As illustrated in FIGS. 7 and 16, the light guide housing member 13 constitutes, together with the light guide retaining member T (T1, T2), a light guide support means. The light guide housing member 13 has concaved groove portions 13a and 13b (first and second housing portions) extending in the longitudinal direction so as to house therein the light guide. The concaved groove portions 13a and 13b are formed integrally with the light guide housing member 13 at symmetrical positions. The groove portions 13a and 13b each have first and second side wall portions 13c, 13d facing the respective first and second reflecting surfaces 30S of the light guide 30, a bottom portion 13e facing the reflecting surface 32 of the light guide 30, and a support surface 13f that supports the light guide 30 in the groove in a predetermined attitude. With the configuration in which the groove portions 13a and 13b are integrally formed at the symmetrical positions, simply by housing the left and right pair of light guides 30 (first light guide 30a, second light guide 30b) in the groove portions 13a and 13b, the light guides 30 can be retained at symmetrical positions, whereby the irradiation surface (R: see FIG. 2) can be illuminated in substantially a symmetrical manner with respect to a center thereof.

One of the first and second reflecting surfaces 30S of the light guide 30 is set as a mounting reference surface 30Sa. The support surface 13f of the light guide housing member 13 has a support curved surface that surface-contacts the mounting reference surface 30Sa so as to support the light guide 30 inside each of the groove portions 13a and 13b in a predetermined attitude.

Since an inner surface of each of the groove portions 13a and 13b has a complicated shape, the light guide housing member 13 is resin molded and is likely to undergo warpage due to shrinkage at the molding time or aging. Thus, as illustrated in FIG. 7, the light guide housing member 13 is supported by the rigid body KF formed of metal so as to eliminate the warpage. That is, four locking claw portions 13a1 protrude from one side portion of the light guide housing member 13 and four locking claw portions 13b1 protrude from the other side portion of the light guide housing member 13, and voids are formed as claw locking portions KF1 and KF2 in the rigid body KF so as to allow insertion of the locking claw portions 13a1 and 13a2 from above and allow the locking claw portions 13a1 and 13a2 to be moved in a direction opposite to the light source unit La after insertion, thereby achieving a structure in which the locking claw portions 13a1 and 13a2 are locked to the claw locking portions KF1 and KF2, respectively.

<Light Guide Retaining Member>

As illustrated in FIGS. 7 and 16, the light guide retaining member T (T1, T2) are provided for retaining the light guide 30 (first light guide 30a, second light guide 30b) housed in the groove portions 13a and 13b in the housing position. The light guide retaining members T1 and T2 have, respectively, continuously-formed abutment surfaces T1b and T2b each extending in parallel to the projecting portion 30P of the light guides 30 housed in the groove portions 13a and 13b in the longitudinal direction and each abut against an upper inclined surface of the projecting portion 30P, locking portions T1a and T2a extending downward from six portions of the respective abutment surfaces T1b and T2b as illustrated in FIG. 7, and locking claws T1c and T2c formed respectively at leading ng ends of the locking portions T1a and T2a. As illustrated in FIG. 16, lower end portions of the rigid body KF that supports the side wall portions 13d of each of the light guide housing members 13 respectively by the locking claws T1c and T2c of the locking portions T1a and T2a, thereby bringing the abutment surfaces T1b and T2b into press contact with the inclined surfaces of the projecting portions 30P of each of the light guide housing members 13. This pressure contact brings the side surfaces 30Sa of each of the light guides 30 that face the support surfaces of the light guide housing members 13 into surface contact with the support surfaces 13f for positioning.

<Rigid Body>

The rigid body will be descried. The rigid body KF is formed of metal or a material having rigidity equivalent to metal that tightly sandwiches the circuit board 16 and heat conductive sheet 15 between itself and heat radiating member 14 so as to effectively conduct the heat of the circuit board 16 that receives the heat from the light source unit La to the heat radiating member 14 through the heat conductive sheet 15. Further, as illustrated in FIG. 13, the rigid body KF has a first plane KF3 having a first mounting reference for the sandwiching as illustrated in FIG. 13, a second plane KF6 having a second mounting reference extending along the longitudinal direction of the light guide 30 from the first flat surface portion KF3 as illustrated in FIG. 7, and a third plane KF7.

<Mechanism for Eliminating Warpage of Light Guide and Light Guide Housing Member>

As described above, by forming the light guide housing member 13 (13a, 13b) and light guide retaining member T (T1, T2) constituting the light guide support means using different materials and by holding, together with the rigid body KF, the groove side wall portion 13d of the light guide housing member 13 by the locking claws T1c and T2c of the locking portions T1b and T2b of the light guide retaining member T (T1, T2) as illustrated in FIG. 16, the following effects can be obtained. The groove side wall portion 13d of the light guide housing member 13 is retained by the rigid body KF and set straight along the reference plane of the rigid body KF, thereby eliminating warpage of the light guide housing member 13 in a horizontal direction. At the same time, the abutment surfaces T1b and T2b of the light guide retaining member T (T1, T2) press the projecting portion 30P of the light guide 30 in a direction in which the side surface 30Sa of the light guide 30 and support surface 13f forming the support curved surface of the light guide housing member 13 surface-contact each other. The abutment surfaces T1a and T2a are formed so as to extend in the longitudinal direction together with the projection portion 30P of the light guide 30 and receive pressing force of the locking portions T1b and T2b even if the light guide 30 is warped into any shape to set straight the light guide 30 along the reference surface of the rigid body KB by abutment, thereby eliminating warpage of the light guide housing member 13 in a vertical direction.

<Face-to-Face Disposition Between Luminous Body and Light Guide>

Next, a supplementary description will be made of disposition of the luminous body that faces the light guide. That is, a description will be made of disposition between the light guide 30 having the end face 30L that takes in light, diffuse reflecting surface 32 that diffusely reflects the light taken in from the end face 30L, and light exit surface 33 that emits the light diffusely reflected at the diffuse reflecting surface 32 to the irradiation surface (R: see FIG. 2) and the luminous body 40 facing at least the one end face 30L of the light guide 30 as illustrated in FIGS. 21 to 23. As illustrated in FIG. 21B, the light exit surface 33, of the light guide 30 is formed by a circumferential surface (radius r), and the diffuse reflecting surface 32 is disposed at a position at which an optical axis normal line hx along which light passes through the center P1 of a circle constituting the circumferential surface (radius r) and is emitted from the light exit surface 33. In the luminous body 40 mounted on the circuit board 16, the luminous body 42 is disposed at a first luminous body mounting position P2 which is set on the optical axis normal line hx of the diffuse reflecting surface 32 and shifted to the light exit surface 33 side with respect to the center P1 of the circle, and the luminous body 41 is disposed at a second luminous body mounting position P3 that is shifted to the diffuse reflecting surface 32 side with respect to the center P1 of the circle. Further, As illustrated in FIG. 22, with the diffuse reflecting surface 32 set as a reference, the center position of the circumferential surface (radius r) constituting the light exit surface 33 is set as Ld0, the first luminous body mounting position P2 at which the luminous body 42 is disposed is set as Ld1, and second luminous body mounting position P3 at which the luminous body 41 is disposed is set as Ld2.

When the luminous body 42 is provided between the center of the circle of the circumferential surface and light exit surface as illustrated in FIG. 23, the light intensity can be made higher at the both end portions of the light guide than at the center portion thereof. This allows the light intensity distribution most appropriate for the illumination device to be mounted in the image reading device of the optical reduction system described above to be achieved. Further, when the two luminous bodies 41 and 42 are used as the luminous body as illustrated in FIGS. 21 and 22, the light intensity can be increased by about two times, and the light intensity can be made higher at the both end portions of the light guide than at the center portion thereof. As a result, it is possible not only to achieve the light intensity distribution most appropriate for the illumination device to be mounted in the image reading device of the optical reduction system but also to increase illumination intensity to thereby increase an image reading speed, which is advantageous for the image reading device having so-called a sheet-through mode in which the document image is read while the document is automatically fed.

Further, with a configuration in which the position of the second luminous body 41 can be adjusted with respect to the first luminous body as a positional reference, even if the intensity of the luminous body is degraded due to aging, it is possible to recover the spectral characteristics to an initial proper state by fine adjustment of the position of the second luminous body 41.

<Positioning of Luminous Body Facing Light Guide>

Next, a supplementary description will be made of positioning of the luminous body that faces the light guide. As illustrated in FIGS. 12 and 14, both the light guide 30 and circuit board 16 are supported by the rigid body KF, and a positional relationship therebetween is properly maintained. The diffuse reflecting surface 32 of the light guide 30 is retained by a third position d3 positioned with respect to the second plane KF6 of the rigid body KF having the second mounting reference. The circuit board 16 is positioned at a first position d1 positioned with respect to the first plane KF3 having the first mounting reference based on the second plane KF6 with the luminous body 40 positioned at a second position d2 facing a reference position d4 of the one end face of the light guide 30. That is, by positioning the diffuse reflecting surface 32 of the light guide 30 at the first position d3 based on the second plane KF6, the mounting position d4 of the light guide is determined. At the same time, by mounting the circuit board 16 having the luminous body 40 mounted thereon to a predetermined position of the first plane KF3 having the first mounting reference based on the second plane KF6, the luminous body 40 mounted on the circuit board 16 is disposed at the second position d2 facing the one end face 30L of the light guide 30, thereby allowing the mounting reference position d2 of the luminous body and mounting reference position d4 of the light guide 30 to easily coincide with each other. Further, it is possible to reduce a variation in the mounting position (position with respect to the optical axis normal line direction) of the luminous body facing the end face of the light guide, thereby reducing occurrence of the illumination spots as well as achieving adjustment of a predetermined gap between the light guide and luminous body.

There are formed, in the first plane KF3 of the rigid body KF having the first mounting reference for determining the mounting position of the light source unit and the second mounting reference for determining the mounting position of the light guide unit, positioning portions 11a and 11b for positioning the circuit board 16 as illustrated in FIG. 13. The circuit board 16 has a positioning support portion (16a, 16b) to be supported by the positioning portions 11a and 11b. With this configuration, simply by mounting the positioning support portion (16a, 16b) of the circuit board 16 to the positioning portions 11a and 11b serving as a reference for mounting the light guide, the mounting position (position with respect to the optical axis normal line direction) of the luminous body facing the end face of the light guide can be fixed without displacement, thereby significantly facilitating assembly of the device.

<Maintenance of Gap Between Light Guide and Luminous Body by Reflector>

A supplementary description will be made of maintenance of the gap between the light guide and luminous body. As illustrated in FIG. 14A, the illumination device 9 includes the light guide 30 having the end face 30L that takes in light, diffuse reflecting surface 32 that diffusely reflects the light taken in from the end face 30L, and light exit surface 33 that emits the light diffusely reflected at the diffuse reflecting surface 32 to the irradiation surface (R: see FIG. 2) and the luminous body 40 facing at least the one end face 30L of the light guide 30. The illumination device 9 further includes the reflector 49 having reflecting surfaces 49a and 49b that reflect the light from the luminous body 40 to the one end face 30L of the light guide 30. The light guide 30 has, its one end face 30L, a projecting piece 30N that abuts the reflector 49. The luminous body 40 is mounted to the circuit board 16 having the luminous body mounted thereon, and the reflector 49 is held between the projecting piece 30N of the light guide 30 and circuit board 16, with the result that a predetermined gap is maintained between the luminous body 40 and light guide 30. Thus, a gap between the luminous body and light guide can be defined by the reflector, preventing a variation of a dimension of the gap to reduce occurrence of the illumination spots. When this illumination device is used as a light source unit of the image reading device, it is possible to prevent occurrence of the illumination spots in the read image.

The light guide 30 has, at its one end face 30L, the projecting piece 30N that abuts the reflector 49. The luminous body 40 is mounted/fixed to the circuit board 16, and the reflector 49 is held between the projecting piece 30N of the light guide 30 and circuit board 16, with the result that a predetermined gap is maintained between the luminous body 40 and light guide 30. With this configuration, the projecting portion of the light guide supports a plane of the reflector over a wide range, so that the circuit board having the luminous body mounted thereon and light guide can reliably be positioned through the reflector, and the positioning state therebetween can be maintained.

The circuit board 16 having the luminous body mounted thereon is disposed with a gap d provided between the light emission surface of the luminous body and light incident surface 30L. The gap d is preferably in a range from 0.1 mm to 0.55 mm. FIG. 14A illustrates an arrangement configuration in a state where the luminous body 40 (41, 42) is mounted on the circuit board 16. The luminous body 40 (41, 42) is constituted by a surface light emitting element and the white LED is used as the luminous body in the present embodiment. Further, in place of the reflective paint, the luminous body 40 (41, 42) may be provided also at the other end face 30R so as to increase the entire light intensity. In this case, the first and second luminous bodies 41 and 42 emit lights at different positions between the reflecting surface 32 and light exit surface 33 and the lights emitted therefrom enters the light guide 30 from the light incident surface 30L of the light guide 30. In addition, the first and second luminous bodies 41 and 42 are arranged spaced apart from each other in an exit light path (denoted by an arrow hx in FIG. 6) extending from the light exit surface 33 to the reading surface R.

In this embodiment that defines the gap between the luminous body and light guide using the reflector, one of left and right planes of the reflector directly abuts against the plane of the circuit board having the luminous body mounted thereon, and the other one directly abuts against the one end face of the light guide. Alternatively, however, the following configuration may be adopted.

The surface of the reflector is coated with a metal film, such as an aluminum film, or a silver film, having high reflection efficiency, so that a thin insulating Mylar may be disposed between the reflector and the circuit board having the luminous body mounted thereon. Further, alternatively, the thin insulating Mylar may be provided in the same manner as above for the purpose of reducing a variation of light of the luminous body.

Further, the surfaces of the reflector and surfaces abutting thereagainst are flat surfaces, but not limited to this. For example, when one of the abutting surfaces has a concavo-convex shape, the other one should be a reversed concavo-convex shape. Further, when one of the abutting surfaces has a curved shape, the other one should be a reversed curved shape.

Further, the light emission surface of the luminous body to be mounted on the circuit board is widely flat, the luminous body itself may be made to abut against the reflector.

Further, the reflector itself may be integrally formed as a part of the luminous body or a part of the light guide or the reflector may be used to define the gap between the luminous body and light guide.

Although the luminous body is provided at one end of the light guide, and the reflecting plate serving as a pseudo light surface is provided at the other end in the above embodiment, when the luminous body is also provided at the other end of the light guide for the purpose of increasing the absolute light intensity, the reflector is also provided by necessity at the other end of the light guide.

[Another Embodiment of Illumination Device]

Next, another embodiment of the above-described illumination device will be described. FIGS. 23A to 23C are views corresponding to FIGS. 21A to 21C, respectively, which illustrate a positional relationship between the luminous body and light guide in the light source unit according to another embodiment, in which FIG. 23A is a side view, FIG. 23B is a plan view illustrating a position of the luminous body with respect to the light guide as viewed from the luminous body side one end of the light guide, and FIG. 23C is a plan view illustrating the position of the luminous body as viewed from the other end side of the light guide. The configuration of FIGS. 23A to 23C only differ from that of FIGS. 21A to 21C in the arrangement and brightness of the luminous body and light guide depending on whether the luminous body 40 is constituted by a single light-emitting element or two light-emitting elements; however, they are substantially the same in basic function.

In this embodiment, as illustrated in FIG. 23A, the luminous body 40 is constituted by a single light-emitting element that faces the light incident surface 30L of the light guide 30 with a certain gap. This luminous body 40 is provided at the light emission source position P2 of FIG. 22. The spectral characteristics in this case will be described later in FIG. 24. Like FIG. 21, FIG. 23 illustrates only one of the light source units which are provided in pair at front and rear positions in the sub-scan direction with respect to the center of the reading surface R.

[Spectral Characteristics of Illumination Device]

Figure 24:
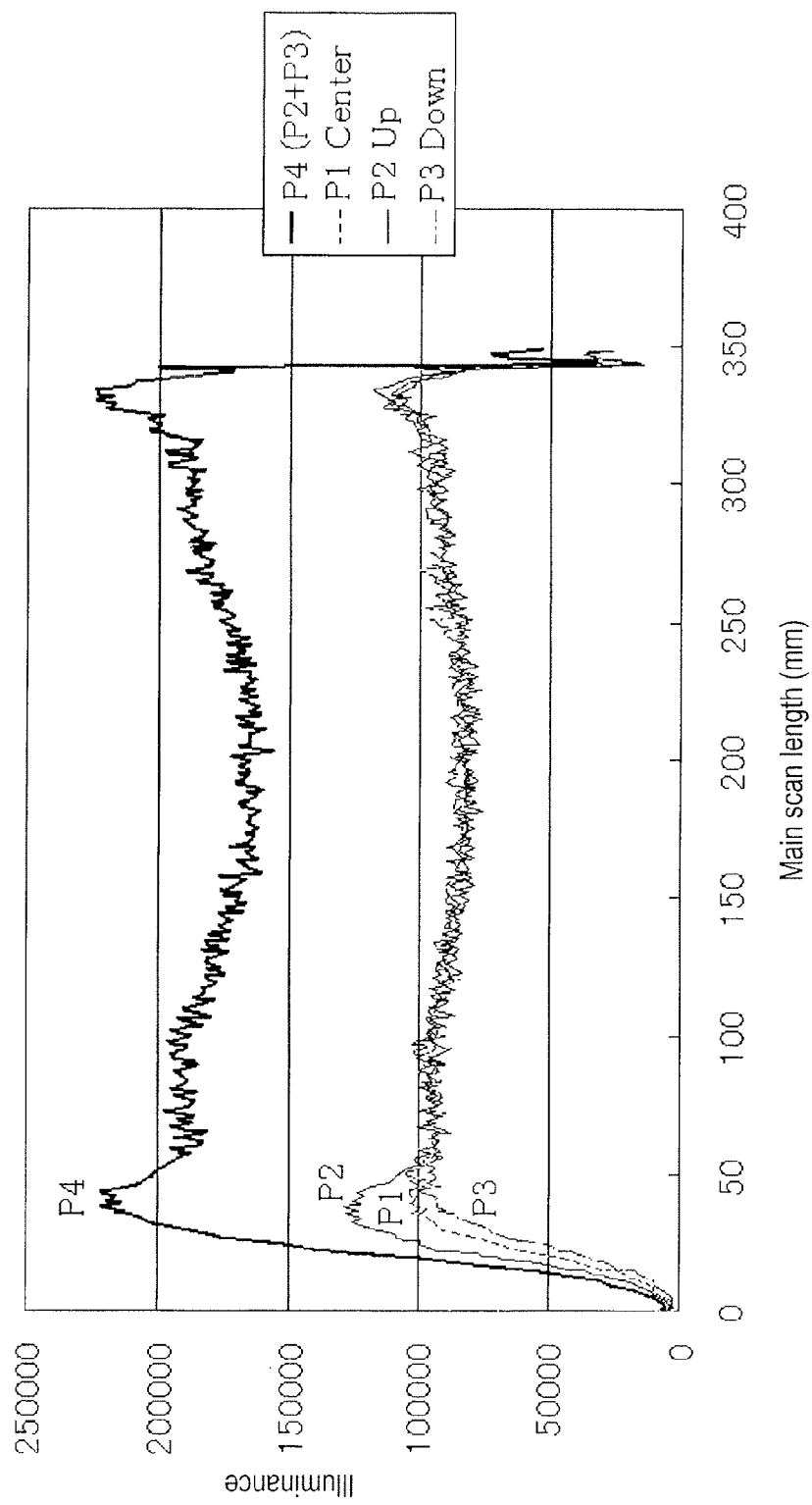
FIG. 24 is a spectral characteristic view showing spectral characteristics of the illumination device in the image reading device of the present invention.

Next, the spectral characteristics of the illumination device in the image reading device of the present invention will be described based on a spectral characteristic view of FIG. 24. Spectral characteristic curves P1 to P4 in FIG. 24 are characteristics obtained when the luminous body 40 is disposed at positions P1 to P3 illustrated in FIG. 22. The spectral characteristic curve P1 represents spectral characteristics obtained when the luminous body 40 constituted by a single light-emitting element (white LED) is disposed at a position of P1 of FIG. 22, the spectral characteristic curve P2 represents spectral characteristics of the another embodiment of FIG. 23 obtained when the luminous body 40 constituted by a single light-emitting element is disposed at a position of P2 illustrated FIG. 22, and the spectral characteristic curve P3 represents spectral characteristics obtained when the luminous body 40 constituted by a single light-emitting element is disposed at a position of P3 illustrated FIG. 22. Further, the spectral characteristic curve P4 represents spectral characteristics of the first embodiment illustrated in FIGS. 2 to 21 obtained when the luminous body 40 (41, 42) constituted by two light-emitting elements is disposed such that 41 and 42 are disposed at positions of P2 and P3 illustrated FIG. 22, respectively. In the case of the illumination device of the image reading device having the above-mentioned contact type optical system, substantially uniform spectral characteristics are required. Thus, in this case, by disposing the luminous body 40 constituted by a single light-emitting element at the position of P1 illustrated in FIG. 22, an illumination device having ideal spectral characteristics can be obtained. On the other hand, in the case of the illumination device of the image reading device in the optical reduction system type that is influenced by the cosine fourth power law of the condenser lens, the light intensity needs to be made higher at the both end portions than at the center portions. Thus, in a case where reading is possible even if the entire light intensity is comparatively low, by disposing the luminous body 40 constituted by a single light-emitting element at the position of P2 illustrated in FIG. 22, an illumination device having ideal spectral characteristics can be obtained; in a case where reading is impossible unless the entire light intensity is comparatively high, by disposing the luminous body 40 (41, 42) constituted by two light-emitting elements is disposed such that the second and first light emission sources 42 and 41 respectively and are disposed at the positions of P2 and P3 illustrated in FIG. 22, an illumination device having ideal spectral characteristics can be obtained.

[Configuration of Image Reading Control System]

Figure 25:
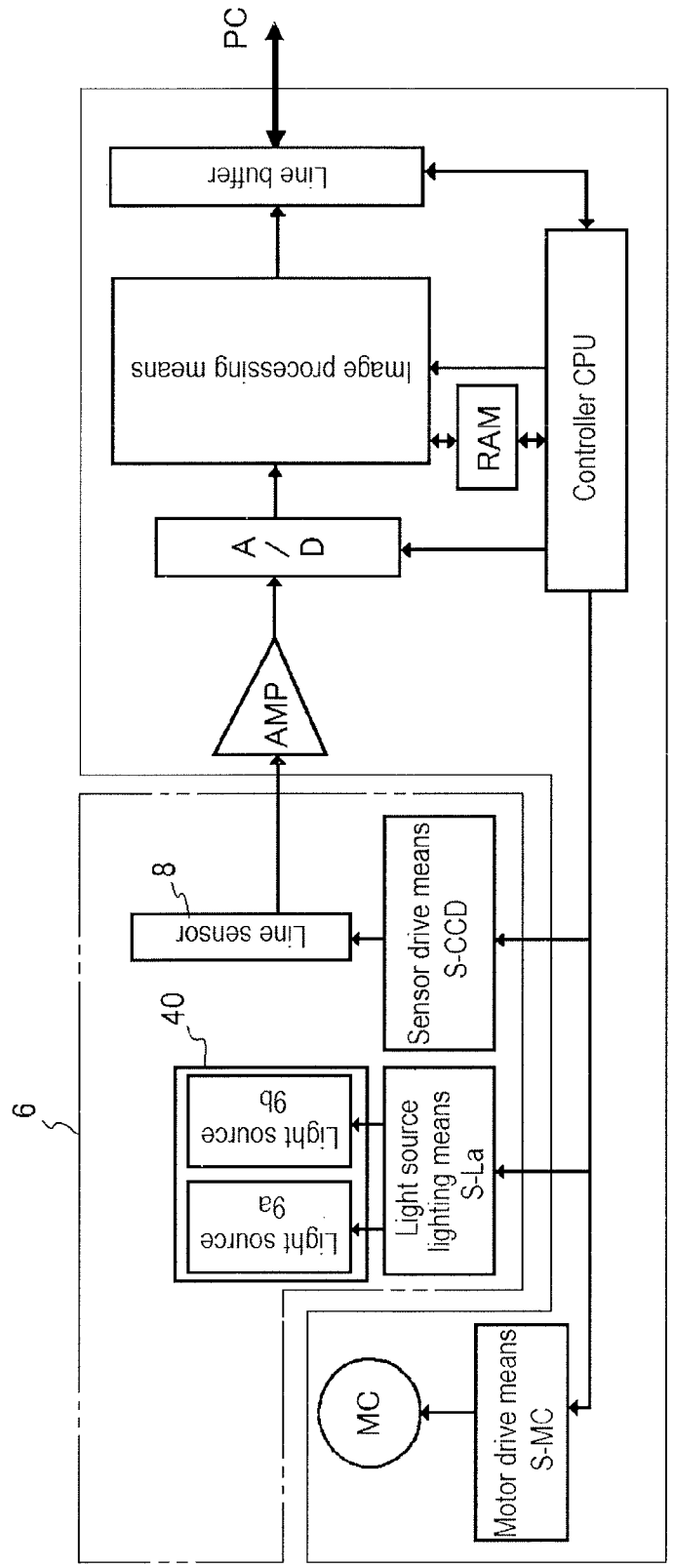
FIG. 25 is a functional block diagram illustrating a control system in the image reading device of FIG. 1 that reads a document image.

Next, an outline of a control system of the image reading device illustrated in FIG. 1 that reads the document image will be described based on FIG. 25. FIG. 25 is a functional block diagram illustrating the control system of the image reading device that reads the document image. A part surrounded by a long dashed double-short dashed line corresponds to the reading carriage 6, and a part surrounded by a thin continuous line corresponds to a control board S provided in the image reading unit A. Basic operations of respective functional blocks in the image reading device are as follows. A controller CPU of the control board drives a motor drive means S-MC, a light source lighting means S-La, and a sensor drive means S-CCD. The sensor drive means S-CCD makes the line sensor 8 perform reading operation of the document sheet. That is, in a state where the reading carriage is being moved or stopped as needed by the motor drive means S-MC, the light source lighting means S-La arbitrarily turns on the luminous body 40 to illuminate the document sheet, causing reflected light from the document to be focused on the line sensor 8 for photoelectric conversion and charge accumulation. An output signal from the sensor 8 is amplified by an amplifier circuit AMP and is then converted into a digital image signal by an A/D converter. The resultant digital image signal is subjected to image processing such as shading correction using shading data stored in an RAM, digital gain adjustment, or digital black correction in an image processing means. Thereafter, the resultant digital image signal is stored in a line butter and transferred to an external device such as a personal computer through an interface. All the above operation are executed by the controller CPU controlling the respective functional blocks based on an instruction from a driver means of the external device.

[Control Configuration of Light Source]

Control of the illumination unit 9 by the light source lighting means S-La will be described. As illustrated in FIG. 1, the first and second illumination units 9a and 9b irradiate the reading surface R of the first and second platens 2 and 3 and use diffusely reflected light from the reading document. Although the first and second illumination units 9a and 9b are each constituted by two luminous bodies 40 in the example illustrated in FIG. 21, the present invention is not limited to this. For example, the first and second illumination units 9a and 9b may each be constituted by a single luminous body 40 as illustrated in FIG. 23A or three or more luminous bodies 40 (not illustrated). When the number of the light sources is increased to increase the entire illumination intensity, it is possible to ensure sufficient reading intensity which is obtained as a product of the illumination intensity and reading time, even if a feeding speed of the document traveling on the second platen 3 is increased by the document feeding unit B in order to increase the reading speed to reduce the reading time in each reading line, thereby achieving high-speed reading using the document feeding unit B.

Actually, the carriage 6 is stopped at a position below the second platen 3, and the speed of reading the document fed on the second platen 3 is increased as compared to a case where the document is read while the carriage 6 is moved along the document placed on the first platen 1. In this case, it is preferable that the light intensity for the reading operation using the second platen 3 is made higher than the light intensity for reading operation using the first platen 2.

Thus, there can be adopted not only a control method that simultaneously turns on the first and second illumination units 9a and 9b, but also a control method that turns on only the first illumination unit 9a when the carriage 6 is positioned below the first platen 2 and turns on both the first and second illumination units 9a and 9b when the carriage 6 is positioned below the second platen 3.

[Means for Preventing Reflection between Light Guide]

As described above, the above-described image reading device includes the luminous body, pair of light guides serving as linear light source that receive light from the luminous body and irradiate the reading surface that faces the light guides, and line sensor that receives the reflected light from the reading surface and as image data. In this configuration, when the pair of light guides (30a, 30b) constituted by the first illumination unit 9a (first light guide 30a) and second illumination unit 9b (second light guide 30b) are disposed symmetrically with respect to an optical axis extending along a normal line ho of the reading surface R as illustrated in FIG. 2, reflection of the light is repeated between the pair of light guides, with the result that the intensity spots are likely to occur in the read image and, in some cases, coloring may change between adjacent pixels. Thus, in order to reduce occurrence of such phenomenon, the image reading device of the present invention has a means ST (ST1, ST2, and ST3) for preventing reflection between light guides that prevents the reflected light of a reflected component that is emitted from one of the pair of light guides and at least positively reflected at the reading surface to the other one of the light guides from being reflected at the latter to the former once again through the reading surface or attenuates this phenomenon. Hereinafter, the reflection preventing means ST will be described based on FIG. 3.

First Example

First, a reflection preventing means illustrated in FIG. 3A will be described. A shield plate ST1 (reflection preventing means) is attached to the illumination device 9 by a double-faced adhesive tape or adhesive so as to be interposed between the reading surface R and pair of light guides 30 (30a, 30b) and to cover substantially the half part of each of the light guides. Actually, as denoted by a long clashed double-short dashed line, an inner end portion of the shield plate ST1 that covers substantially the outer half of each of the light guides is located at a position that shields part of light emitted from the light guide to the reading surface that passes outside two equal side constituting substantially an isosceles triangle having a bottom side defined by a side connecting center portions of the pair of light guides 30 (30a, 30b) and an apex defined by a center portion of the reading line of the reading surface R. The shield plate ST1 is obtained by cutting a black film sheet obtained by having synthetic resin such as polyester or polycarbonate containing black pigment such as carbon and is formed into a thin frame body having, at its center portion, a rectangular aperture elongated in the longitudinal direction of the rod-like light guide, through which the light with which the reading surface R is irradiated penetrates. In this example, a polycarbonate film having a film thickness of, e.g., 0.18 mm is used as the shield plate ST. Thus obtained shield plate ST is attached to a light emission aperture surface of the illumination device 9 serving as a support body for supporting the pair of light guides by an adhesive means such as a double-faced tape at a portion in front of the light guides on the reading surface side in a positioned state as illustrated in the drawing. By the shield plate ST1, reflected lights *1 and *2 (only one side is illustrated in the drawing) denoted by dashed lines that are positively reflected at the reading surface R can be shielded. If allowable in terms of product specification, a configuration in which only one side of the light guides is shielded may be adopted. The above center portion of each of the pair of light guides 30 (30a, 30b) is a reflection surface center of a common light guide serving as a base end of the illumination light.

Second Example

Next, a reflection preventing means illustrated in FIG. 3B will be described. A convex portion ST2 (reflection preventing means) is formed on the light exit surface 33 (see FIG. 14A) of the pair of light guide means 30 (30a, 30b). The convex portion ST2 has a diffusion surface that diffuses incident light emitted from the other light guide and reflected at the reading surface R. Actually, the illustrated convex portion ST2 projects from the light exit surface 33 in a semicircular shape having a radius of 0.75 mm to 1.0 mm and extends in the longitudinal direction of the rod-like light guide so as not to return back but to diffuse, at its projecting surface, incident reflected light *3 (only one side is illustrated in the drawing) emitted from the other light guide and reflected at the reading surface R. If allowable in terms of product specification, a configuration may be adopted in which the convex portion ST2 is formed in only one side of the light guides. Further, a plurality of the convex portions ST2 may be formed adjacently in one light guide.

Third Example

Next, a reflection preventing means illustrated in FIG. 3C will be described. As illustrated, the pair of light guides 30

(30a, 30b) are disposed asymmetrically (ST3: reflection preventing means) with respect to the optical axis of reflected light reflected at the reading surface and directed in the normal direction. By disposing the pair of light guides 30 asymmetrically (ST3), the light emitted from one light guide and reaches the other light guide through the reading surface R and the light emitted from the other light guide and reaches the one light guide through the reading surface R are not coincide with each other. For example, reflected light *4 that reaches the one light guide and enters therein from the light exit surface 33 is emitted in a different direction from the light exit surface 33, with result that reflected light repeatedly reflected between the pair of light guides can be attenuated. Although, in this case, a distance between the optical axis ho and light guide 30a and a distance between the optical axis ho and light guide 30b are made to differ from each other, a distance between the reading surface R and light guide 30a and a distance between the reading surface R and light guide 30b may be made to differ from each other. Further, in a case where the light guides 30a and 30b have the illustrated shape, positions of the light guides 30a and 30b are not changed, but attitude of the light guide 30b is made to differ from the attitude of the light guide 30a. Also in this case, an asymmetric state can be achieved in terms of a light path of an optical system.

Fourth Example

Further, by arbitrarily combining the reflection preventing means ST of the above-described first to third examples, it is possible to attenuate reflected light repeatedly reflected between the pair of light guides more effectively.

As illustrated in FIG. 2, in the image reading device, heat of the line sensor 8 is transmitted from a sensor support member to the unit frame 11 through a lens support member. The sixth mirror 10f is supported by a mold member 57 of the unit fame 11, so that a mirror may be unintentionally inclined or displaced under the influence of heat, which may in turn cause a variation in the position of the optical system. The sixth mirror 10f is a final mirror that receives light in the last place to make the light enter the line sensor 8, so that accuracy is required for the sixth mirror 10f in terms of angle and position. However, the sixth mirror 101 is provided at a position near the line sensor 8, to which heat of the line sensor 8 is easily conducted, so that it is subjected to heat expansion of the unit frame 11. Thus, a cut portion 58 is formed in the mold member 57 so as to isolate a mounting portion of the sixth mirror from other components, thereby achieving heat radiating function. By increasing a surface area of the cut portion 58 or by forming a plurality of cut portions 58, heat radiating performance can be enhanced.

INDUSTRIAL APPLICABILITY

The illumination device according to the present invention can be applied to a device other then the above-described image reading apparatus and can be used as an illumination device for an optical instrument such as an optical microscope, an overhead projector, or a projector, or as a household use illumination device.

The application claims the benefits of Japanese Patent Application No. 2011-018483, Japanese Patent Application No. 2011-018484, Japanese Patent Application No. 2011-018485, Japanese Patent Application No. 2011-018486, Japanese Patent Application No. 2011-018487, Japanese Patent Application No. 2011-136172, Japanese Patent Application No. 2011-136173, Japanese Patent Application No. 2011-143797, and Japanese Patent Application No. 2011-188441, which are hereby incorporated by reference.

EXPLANATION OF SYMBOLS

A: Image Reading unit
B: Document feeding unit
T: Light guide retaining member (light guide support means)
T1b: Abutment surface
T2b: Abutment surface
T1c: Locking claw
T2c: Locking claw
KF: Rigid body
9: Illumination device
9a: First illumination unit
9b: Second illumination unit
13: Light guide housing member (light guide support means)
13a: Groove portion
13c: First side wall portion
13d: Second side wall portion
13e: Bottom portion
13f: Support surface
30: Light guide
30a: First light guide
30b: Second light guide
30L: Light incident surface
30S: First and second reflecting surfaces
32: Reflecting surface
33: Light exit surface
30P: Projecting portion
40: Luminous body

The invention claimed is:
1. An illumination device comprising:
a light guide including one end face for taking in light, a diffuse reflecting surface for diffusely reflecting the light taken in from the one end face, and a light exit surface for emitting the light that is diffusely reflected at the diffuse reflecting surface towards an irradiation surface;
a light source facing the one end face of the light guide; and
a reflector having another diffuse reflecting surface that reflects light from the light source toward the one end face of the light guide,
the light exit surface of the light guide being formed into an arc-like shape,
the diffuse reflecting surface being disposed at a position at which an optical axis normal line along which light passes through a center of a circle constituting the arc and emitted from the light exit surface is formed,
the light source being mounted on a circuit board formed separately from the light guide and disposed at a position which is set on the optical axis normal line of the diffuse reflecting surface and shifted to the light exit surface side with respect to the center of the circle,
wherein the light guide has, at the one end face, a flange portion that abuts against the reflector, and
the reflector is held between the flange portion of the light guide and the circuit board so as to maintain a predetermined gap between the light source and the one end face of the light guide.
2. The illumination device according to claim 1, wherein a reflecting plate is attached to the entire surface of the other end face of the light guide through an adhesive material having high light transmittance and defining a predetermined gap.

3. The illumination device according to claim 1, wherein
the light guide is supported by a light guide support unit for supporting the light guide,
the light guide includes:
first and second reflecting surfaces that extend in a longitudinal direction in a face-to-face manner and allows light taken in from the one end face to propagate in a longitudinal direction while diffusely reflecting the light; and
a projecting portion other than the flange portion that projects from at least one of the first and second reflecting surfaces and extends in the longitudinal direction,
the diffuse reflecting surface reflects, in a direction crossing the longitudinal direction, the light diffusely reflected at the first and second reflecting surfaces,
the light guide support unit includes:
a light guide housing member having therein a groove portion extending in the longitudinal direction so as to house the light guide; and
a light guide retaining member that retains the light guide housed in the groove portion of the light guide housing member at its housing portion,
the groove portion of the light guide housing member includes:
first and second side wall portions facing the first and second reflecting surfaces of the light guide, respectively;
a bottom portion facing the diffuse reflecting surface of the light guide; and
a support surface supporting the light guide in the groove portion in a predetermined attitude,
the light guide retaining member includes:
an abutment surface extending in parallel to the projecting portion of the light guide housed in the groove portion of the light guide housing member in the longitudinal direction and abutting against the projecting portion of the light guide; and
a locking portion holding the side wall portion of the light guide housing member that faces a side wall of the light guide having the projecting portion against which the abutment surface abuts so as to bring the abutment surface into press contact with the projecting portion of the light guide to position the side surface of the light guide that faces the support surface of the light guide housing member to the support surface.

4. The illumination device according to claim 3, wherein
the first and second reflecting surfaces of the light guide are each formed by at least a first surface connected to the light exit surface of the light guide and a second surface connected to the diffuse reflecting surface of the light guide, and
the diffuse reflecting surface changes a width of the light guide in a direction perpendicular to the longitudinal direction by inclination of the second surface and has a reflection pattern surface whose width is sequentially increased from a light incident surface as the one end toward the other end in the longitudinal direction.

5. The illumination device according to claim 4, wherein
the first and second reflecting surfaces are formed by curved surfaces having a first curvature and a second curvature, respectively, and
the reflection pattern is formed by changing the width of the diffuse reflecting surface in a direction perpendicular to the longitudinal direction based on a change in the second curvature of the second reflecting surface.

6. The illumination device according to claim 5, wherein
the first curvature defining the curved surface of the first reflecting surface is set constant over the entire longitudinal direction, and
the second curvature defining the curved surface of the second reflecting surface so as to change the width of the reflecting surface is changed at least in three stages.

7. The illumination device according to claim 3, wherein
the projecting portion of the light guide extends in the longitudinal direction from a projection formation position spaced apart by a predetermined distance in the longitudinal direction from the one end face of the light guide forming a light incident surface that the light source faces,
an inner surface of the projecting portion forms a reflecting surface together with the first and second reflecting surfaces, and
the first and second reflecting surfaces sequentially increase in width from the projection formation position of the projecting portion toward the light incident surface.

8. The illumination device according to claim 3, wherein
the light guide and light guide housing member are both formed of a resin molded material,
the light guide housing member housing the light guide is supported by a rigid body such as metal, and
a locking portion of the retaining member holds a groove portion side wall portion of the light guide housing member together with the rigid body.

9. The illumination device according to claim 8, wherein
the light guide housing member has a projecting portion connected to at least one of the first and second side wall portions and extending in a direction crossing the longitudinal direction, and
the locking portion of the retaining member holds the side wall portion having the projecting portion.

10. The illumination device according to claim 9, wherein
one of the first and second reflecting surfaces of the light guide is set as a mounting reference surface,
the support surface of the light guide housing member has a support curved surface that surface-contacts a side surface set as the mounting reference surface by which the light guide is supported inside a groove of the groove portion in a predetermined attitude, and
the abutment surface of the light guide retaining member presses the projecting portion of the light guide in a direction in which the side surface of the light guide and support curved surface of the light guide housing member abut against each other.

11. The illumination device according to claim 10, wherein
the light guide has an illumination area between both end portions in the longitudinal direction, and
the diffuse reflecting surface of the light guide has one end in the longitudinal direction at a portion between the one end of the light guide on the light source side and a portion thereof in front of the illumination area and extends in the longitudinal direction so as to increase in width of the diffuse reflecting surface toward the other end of the light guide.

12. The illumination device according to claim 11, wherein
the width of the diffuse reflecting surface is formed by changing a curvature of a curved surface connecting the reflecting surface of the light guide and diffuse reflection surface thereof.

13. The illumination device according to claim 1, wherein the light guide is formed in pairs, and
the illumination device further comprises a unit for preventing reflection between the pair of light guides that prevents reflected light, at least positively reflected light, from the reading surface, from entering into the other light guide and coming back to the original light guide via the same way in reverse, or attenuates this phenomenon.

14. The illumination device according to claim 1, wherein the light source includes first and second light sources,
the first light source is disposed at a first position which is set on the optical axis normal line of the diffuse reflecting surface and shifted to the light exit surface side with respect to the center of the circle, and
the second light source is disposed at a second position which is set on the optical axis normal line and shifted to the diffuse reflecting surface side with respect to the center of the circle.

15. The illumination device according to claim 1, wherein the light guide and circuit board have a common single reference surface,
the diffuse reflecting surface of the light guide is retained at a first position determined based on the common reference surface, and
the circuit board is positioned based on the common reference surface and disposed at a second position at which the light source faces the one end face of the light guide.

16. The illumination device according to claim 15, wherein the common reference surface is provided in a unit frame that constitutes the illumination device,
the light guide is housed in a frame body supported by the unit frame, and
the diffuse reflecting surface of the light guide is retained through the frame body at the first position determined based on the common reference surface.

17. The illumination device according to claim 16, wherein the common reference surface is set on the unit frame that constitutes the illumination device,
a positioning potion for positioning the circuit board is formed in the unit frame, and
the circuit board has a positioning support portion supported by the positioning portion formed in the unit frame.

18. The illumination device according to claim 17, further comprising a frame body housing the light guide, wherein
the light guide has a projection formed on a side surface along the optical axis normal line formed by the diffuse reflecting surface and locked by the frame body along a longitudinal direction of the light guide, and a distal end of the projection on the light source side is formed between the light source side end face of the diffuse reflecting surface and light source side end face of the illumination area with respect to the longitudinal direction.

19. An image reading device comprising:
a platen on which a reading document is placed;
a light source unit comprising the illumination device as claimed in claim 1, the light source of the illumination device being adapted to illuminate the reading document placed on the platen; and
a light receiving unit that receives reflected light from the reading document illuminated by the light source.

* * * * *